United States Patent [19]

Marry et al.

[11] Patent Number: 4,827,507

[45] Date of Patent: May 2, 1989

[54] DUPLEX ANALOG SCRAMBLER

[75] Inventors: Patrick J. Marry, Cary; Gregory P. Wilson, Lake Zurich; Michael W. Houghton, Hoffman Estates, all of Ill.

[73] Assignee: Motorola, Inc., Schaumburg, Ill.

[21] Appl. No.: 65,220

[22] Filed: Jun. 19, 1987

[51] Int. Cl.[4] .......................... H04K 1/04; H04L 9/04

[52] U.S. Cl. .......................................... 380/38; 380/47; 380/48

[58] Field of Search .................. 380/9, 34, 38, 44, 47, 380/48

[56] References Cited

U.S. PATENT DOCUMENTS

| | | | |
|---|---|---|---|
| 3,651,404 | 3/1972 | Rollins | 380/39 |
| 3,688,193 | 8/1972 | McDonald | 380/38 |
| 4,200,770 | 4/1980 | Hellman et al. | 380/44 |
| 4,218,582 | 8/1980 | Hellman et al. | 380/49 |
| 4,268,720 | 5/1981 | Olberg et al. | 380/45 |
| 4,309,569 | 1/1982 | Merkle | 380/23 |
| 4,351,982 | 9/1982 | Miller et al. | 380/30 |
| 4,405,829 | 9/1983 | Rivest et al. | 380/30 |
| 4,424,414 | 1/1984 | Hellman et al. | 380/44 |
| 4,434,323 | 2/1984 | Levine et al. | 380/48 |
| 4,471,164 | 9/1984 | Henry | 380/30 |

OTHER PUBLICATIONS

Hellman, "The Mathematics of Public-Key Cryptography", Scientific American, vol. 241, No. 2, Aug., 1979, pp. 146-157.

Lee et al., "A New Frequency Domain Speech Scrambling System Which Does Not Require Frame Synchronization"; IEEE Transactions on Communications, vol. COM-32, No. 4, Apr., 1984, pp. 444-456.

Frequency-Inverter IC Scrambles, Descrambles Voiceband Communications, EDN, Jun. 12, 1986, p. 87.

Van Lannep et al., "Frequency Inversion Scrambler Uses Micro-Processed SSB Audio", Mobile Radio Technology, Aug., 1984, pp. 34-40.

"Frequency Inverter IC Scrambles, Descrambles Voiceband Communications", EDN, Jun. 12, 1986, p. 87.

Toyocom—Product Brochures—"Voice Encryptor TCV-851" and Voice Encryptor TCV-852 Series.

*Primary Examiner*—Salvatore Cangialosi
*Attorney, Agent, or Firm*—Raymond A. Jenski; Rolland R. Hackbart

[57] ABSTRACT

An analog frequency inversion scrambler employing an exchange of random number seeds between an originating scrambler and an answering scrambler to create two pseudo-random frequency hopping rolling codes has been disclosed. The rolling code used in one direction of a duplex channel is different than the rolling code in the opposite direction and each code is synchronized by periodic synchronization signals.

47 Claims, 17 Drawing Sheets

DUPLEX ANALOG SCRAMBLER

BACKGROUND OF THE INVENTION

This invention relates generally to a duplex analog voice-band scrambler for secure communications and more particularly to a multiple hop frequency inversion scrambling device for limited bandwidth communications channels such as standard telephone lines and radiotelephone communication circuits.

Communications between individuals on an unsecure communications channel are well known to be subject to casual eavesdropping or more malicious interception of messages. Conventional wireline communications, i.e. telephone calls, while protected by law, are still susceptible to illegal wiretapping and interception of messages but with some difficulty. The problem becomes even more severe when the communications channel utilizes radio links to convey the messages. Lawful means of receiving radio channels exist and provide easy access to the messages being carried via radio. Cellular radiotelephone systems offer a particularly severe combination of technology and mental state of the typical user which provides easy access to messages carried by the systems. The communications channel in a cellular radiotelephone system generally consists of both radio and landline links, each link being available to its own type of message interception. Furthermore, the typical cellular radiotelephone user thinks of the radiotelephone as an extension of the landline system (as it is) and therefore not particularly easy to intercept messages. Unfortunately, this is not the case.

To protect the security of messages transmitted over a communications channel, two broad categories of security-creating have been devised. Analog messages, such as voice, may be converted to digital signal representations of the analog signal or textual material may be represented by a digital signal. The digital signal may then be permuted into a cryptographic signal by arithmetic processes using secret or public encyihering keys and subsequently transmitted over an unsecure channel. The intended recipient of the message can receive the cryptographic signal, decipher the signal using a secret deciphering key, and recover the message. Further background for this technique may be found in "The Mathematics of Public-Key Cryptography", Martin E. Hellman, Scientific American, August 1979, Vol. 241, Number 2, pp. 146–157.

Unfortunately for narrow-bandwidth channels, however, the secure digital cryptographic signal with acceptable signal quality requires a wide bandwidth for proper signal transmission. A second secure communications approach utilizes frequency inversion of the analog signal to introduce security. This technique can remain within the bandwidth of a narrow band channel. The analog signal is not converted to digital representations, rather, the analog signal is mixed against a single frequency tone in a square-law mixer or balanced modulator and the lower sideband of the product of the tone and the analog signal is selected by a filter. The resultant signal is one in which the analog signal has the lowest frequency components and highest frequency components reversed and shifted in frequency.

The single tone frequency inversion scrambler is extremely easy to defeat. The eavesdropper need only to inject a single tone into a square law detector and adjust the tone frequency to be essentially identical to that used to initially invert the analog signal. Improvements to the frequency inversion scrambler have utilized multiple inversion tones sequenced over time in a pseudorandom fashion. Further improvements have utilized a combination of frequency inversion, time inversion, and time hopping segment permutation to make the narrow band scrambler more secure. (See U.S. Pat. No. 4,434,323). Each improvement, however, has increased the complexity and cost of the scrambling system and has further complicated the synchronization of the inversion hopping algorithm.

SUMMARY OF THE INVENTION

Therefore, it is one object of the present invention to provide an analog limited band frequency inversion scrambler utilizing a tone frequency hopping process determined by a key generated rolling code process.

It is another object of the present invention to utilize one rolling code to generate one pattern of tone frequency hopping on one half of a duplex channel and a second rolling code to generate a different pattern of tone frequency hopping on the other half of the duplex channel.

It is a further object of the present invention to protect the exchange of keys and synchronization from interruptions in the communications channel.

It is a further object of the present invention to automatically generate the keys so that user involvement with key generation is removed.

Accordingly, these and other objects are encompassed in the present invention which is an analog frequency inversion scrambler operating over an audio frequency band communications channel. An unsecure first message is sequentially frequency inverted into a secure first message and transmitted to a second analog frequency inversion scrambler on the channel A secure second message, received from the second scrambler on the channel, is sequentially frequency reinverted by the scrambler. The scrambler exchanges a first seed number for a second seed number with the second scrambler to facilitate the generation of a first code to sequence the frequency inverting of the unsecure first message and the generation of a second code to sequence the frequency reinverting of the secure second message. Further, a first code synchronization signal is transmitted by the scrambler to synchronize the frequency reinverting of the secure first message at the second scrambler and a second code synchronization signal is received by the scrambler to synchronize the second code to the second code synchronization signal.

DESCRIPTION OF THE PREFERRED EMBODIMENT

Figure 1:
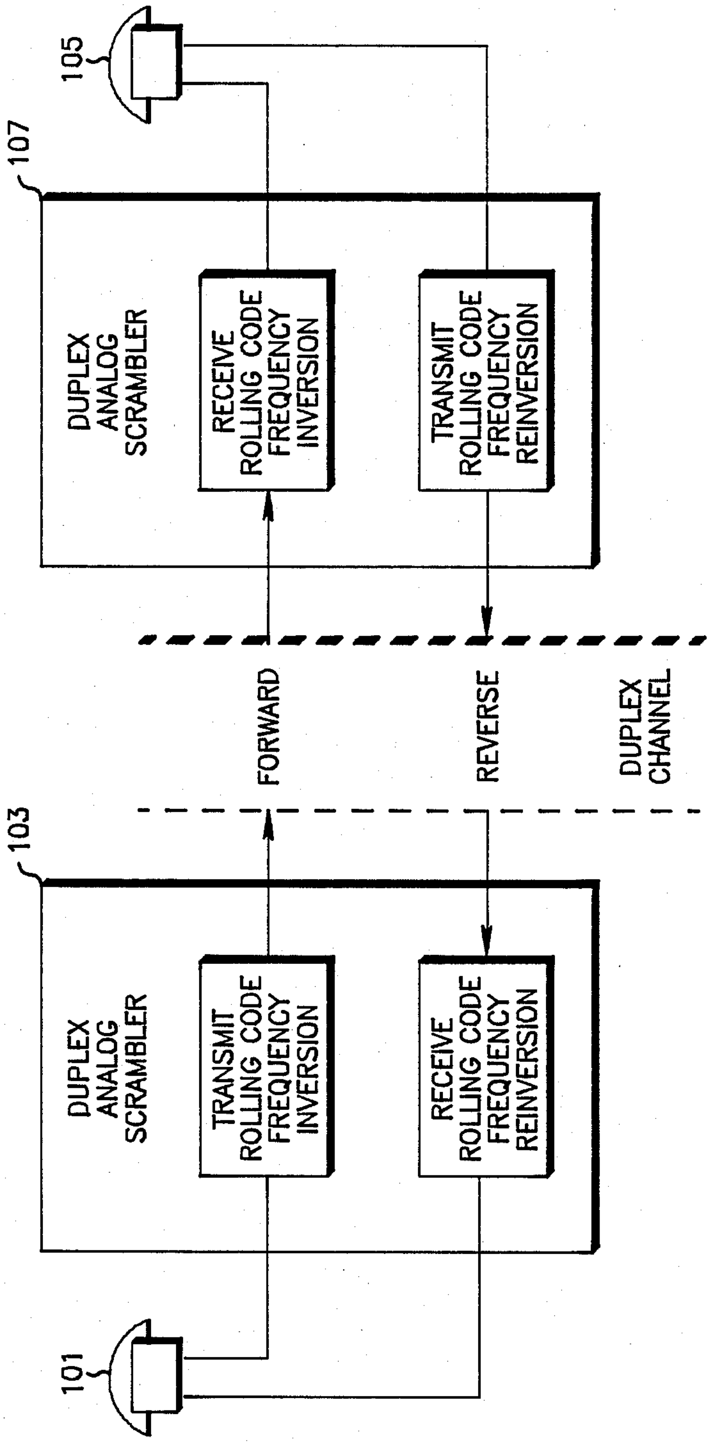
FIG. 1 is a simplified block diagram illustrating the connection of the duplex analog scrambler of the present invention to a duplex channel.

The duplex analog scrambler employing the present invention may be utilized over a narrow band communications channel such as shown in FIG. 1. One type of narrow band channel could be a standard telephone line in which the forward and reverse portions of the duplex channel are combined with conventional hybrids. In this application, audio from a microphone in the telephone instrument 101 may be coupled to an input of the duplex analog scrambler 103, frequency inverted in accordance with the present invention, and applied as scrambled audio to a hybrid (not shown) and then to the balanced wire pair of the telephone system. The balanced wire pair is coupled to the public switched telephone network (PSTN) where it may be switched and coupled to the balanced wire pair leading to a called telephone instrument 105 in conventional fashion. Disposed between the PSTN and telephone instrument 105 is a second duplex analog scrambler 107 operating in accordance with the present invention. The scrambled (frequency inverted) audio from scrambler 103 is subsequently reinverted at scrambler 107 to produce a clear audio signal which is applied to the earpiece of telephone instrument 105. In the opposite direction, audio from the microphone of telephone instrument 105 is scrambled by the duplex analog scrambler 107, applied to the PSTN, reinverted by duplex analog scrambler 103 and applied to the earpiece of telephone instrument 101.

Figure 2:
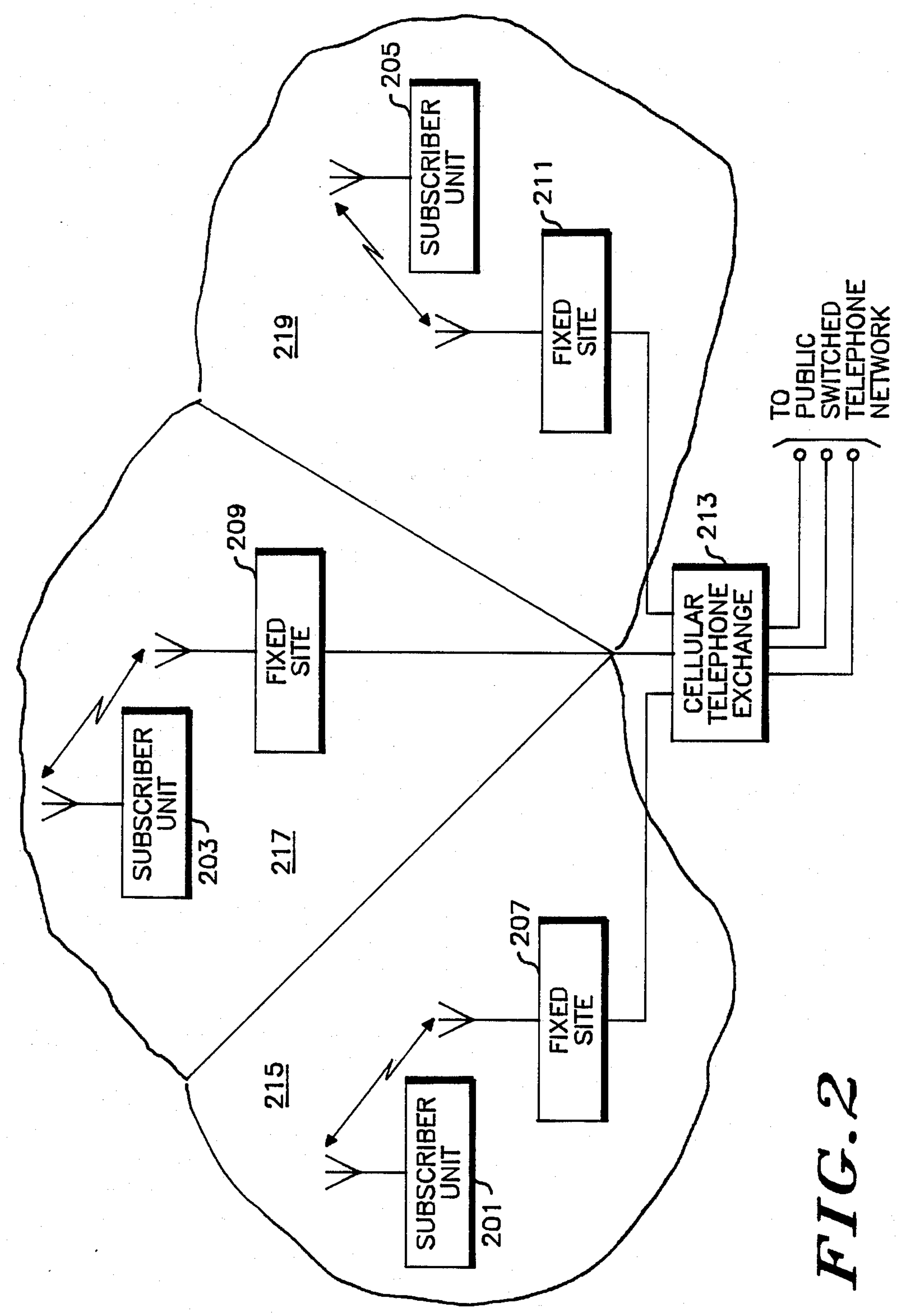
FIG. 2 is a block diagram of the basic elements of a cellular system which may utilize the present invention.

The analog scrambler of the present invention also comprises particular characteristics which are advantageous when used in a radiotelephone system such as a cellular radiotelephone system as diagrammed in FIG. 2. The scrambler of the present invention may be installed in conventional subscriber unit radiotelephones such as units 201, 203, and 205 to produce secure duplex communication between the subscriber unit and fixed site equipment (when the companion scrambling station is disposed on the connection between the cellular telephone exchange 213 and the PSTN) or between the subscriber equipment and the far-end telephone instrument (when the far-end telephone instrument is equipped with the companion scrambling station). (The far-end telephone instrument may be another subscriber unit). Radiotelephone communication may be established by a subscriber unit with conventional fixed site radio and control equipment such as fixed site equipment 207, 209 and 211. Each fixed site equipment is coupled to a conventional cellular telephone exchange 213 which performs the operation of call placement, control, and interconnection with the public switched telephone network (PSTN). As is well known, cellular systems are divided into discreet radio coverage areas, cells, to provide radio coverage over a wide geographic area. Such cells are diagrammatically shown in FIG. 2 as areas 215, 217, and 219.

As a subscriber unit travels from one geographic area to another, for example, as subscriber unit 201 travels from area 215 to area 217, control computers at fixed site equipment 207 and 209 and control computers at the cellular telephone exchange 213 determine that a handoff of the radio channel between fixed site equipment 207 and the subscriber unit should occur thereby connecting subscriber unit 201 to fixed site equipment 209. This handoff process conventionally mutes the audio transmitted by subscriber unit 201 and transmitted by fixed site 207, conveys a digital message to subscriber unit 201 to retune its radio equipment to the channels available through fixed site 209, and once subscriber unit 201 has done so, allows the audio path to again be unmuted. Interruptions such as handoff or radio path fades can cause serious operational problems with scrambling equipment not employing features of the present invention.

Figure 3:
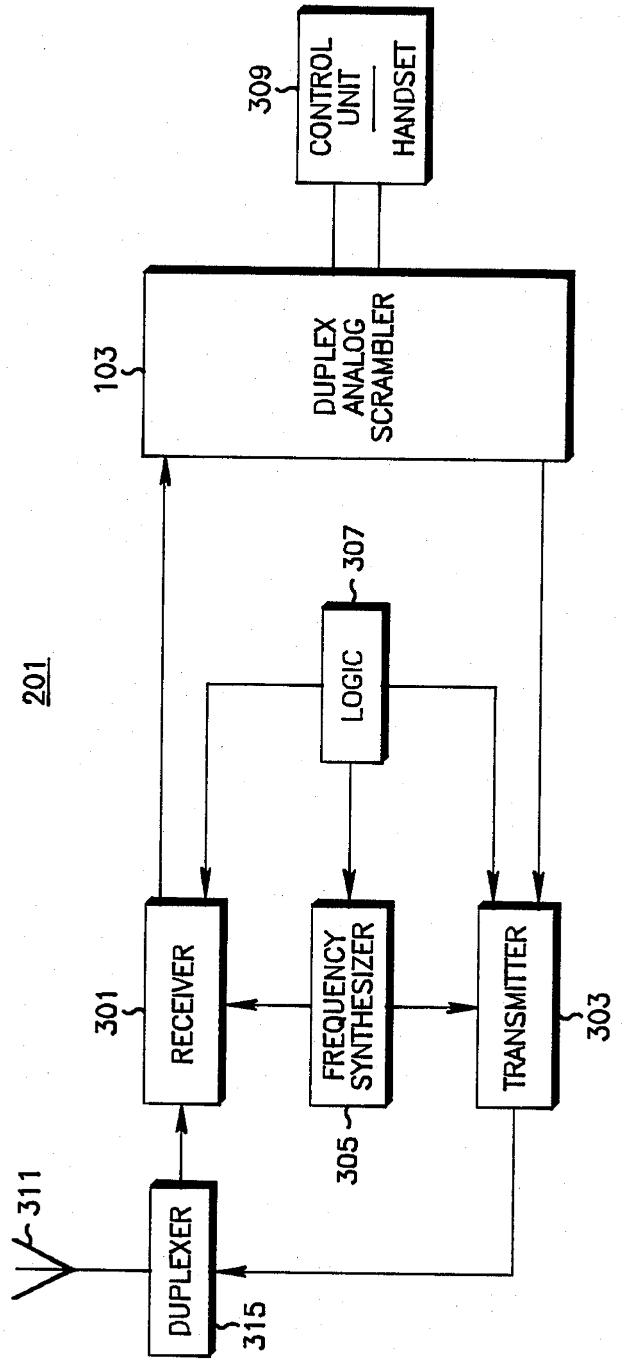
FIG. 3 is a block diagram of a subscriber unit of a cellular radiotelephone system which may employ the present invention.

A subscriber unit which may advantageously employ the present invention is shown in the block diagram FIG. 3. A commercially available radiotelephone transceiver such as a model no. F19ZEA8439AA manufactured by Motorola, Inc. may be coupled to the duplex analog scrambler 103 as shown. Such a radio transceiver consists of a receiver portion 301, a transmitter portion 303, a frequency synthesizer portion 305, a logic portion 307, and a control unit and handset portion 309. The receiver portion 301 is coupled to an antenna 311 via a duplexer 315. The duplexer 315 also couples transmitter portion 303 to the antenna 311 in such a manner that receive signals and transmit signals may be received and transmitted essentially without interference to each other. Signals recovered and detected by receiver portion 301 are typically coupled to the control unit and handset 309 portion to be presented to a user via a telephone earpiece. Likewise audio from the user are accepted by a handset microphone and coupled to transmitter portion 303 for transmission to the fixed site equipment 207. Disposed in the audio path between the receiver 301 and the control unit 309 and in the audio path between the control unit 309 and the transmitter portion 303 is the duplex analog scrambler 103 of the present invention. (It is also possible that a hands-free speaker and external microphone can be employed with the analog scrambler of the present invention). This duplex analog scrambler 103 independently operates on the received audio from receiver portion 301 and the audio from the control unit handset 309 being applied to transmitter 303. Such independent scrambling and descrambling in each direction provides additional security to the duplex message in that an unauthorized breaking of the code on one half of the duplex channel will not easily lead to the breaking of the code in the other half of the duplex channel.

Although the scrambler of the present invention has been described in applications such as wireline and radiotelephone, it need not be so limited. It would have further utility in any application requiring security of analog communications over a limited bandwidth channel.

Figure 4:
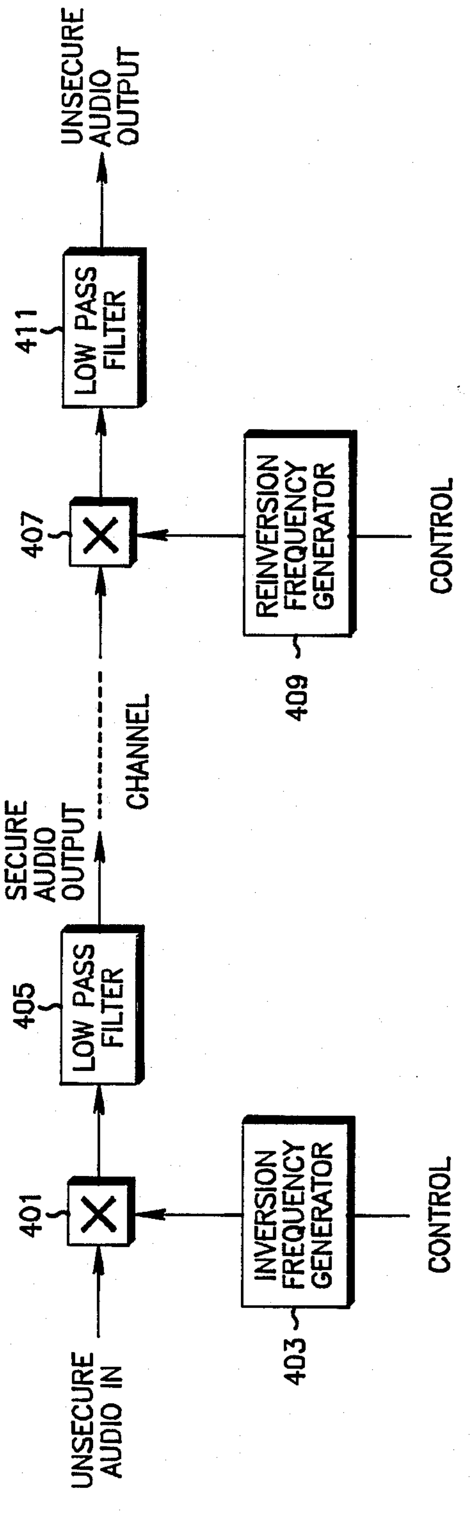
FIG. 4 is a block diagram of a frequency inverting and reinverting scrambler.

Basic operation of a frequency inversion scrambler may be apprehended from the block diagram of FIG. 4. An unsecure audio signal is input to one port of a balanced mixer 401. An inversion frequency signal, generally higher in frequency than the highest expected frequency of the audio signal, is generated by an inversion frequency generator 403 and applied to a second port of balance mixer 401. Typically, the balanced mixer 401 consists of devices having square law transfer characteristics such as diodes oriented in a conventional balanced configuration. The square law devices are fed the inversion frequency with each side 180° out of phase thus enabling the cancellation of the inversion frequency at the output port of balanced mixer 401. The unsecure audio signal instantaneously unbalances the balanced system generating a signal at the output port composed of the sum and difference frequencies between the unsecure audio signal input and the inversion frequency as well as the inversion frequency itself. The output signal is then filtered by lowpass filter 405 which removes the inversion frequency and the sum signal. The secure audio output signal, then, would be transformed in such a way that low frequency unsecure audio signals input would appear as high frequency signals and high frequency unsecure audio signals input would appear as low frequency signals. For example, if the inversion frequency were equal to 3500 Hz and the unsecure audio signal consisted of two frequencies of 300 Hz and 2500 Hz, the 2500 Hz signal would be transformed to a 1000 Hz signal and the 300 Hz signal would be inverted to a 3200 Hz signal (the difference between the unsecure audio input signal and the inversion frequency signal). Thus the secure output signal can be applied to a channel having the bandwidth capable of passing the unsecure audio signal and conveyed to a receiver.

At the far end of the channel, a frequency inversion descrambler utilizes a balanced mixer 407 having an input port for the secure audio signal and an input port for a reinversion frequency signal. The reinversion frequency, generated by frequency generator 409 should essentially be identical to that frequency utilized in the inversion process by frequency generator 403. The output of balanced mixer 407, operating in the same way as balanced mixer 401, is filtered by lowpass filter 411 thereby yielding a reinverted and now unsecure audio output equivalent to the unsecure audio signal input to the scrambling system. Unsecure audio signals which are to be communicated in the opposite direction on the channel may be subjected to the same type of frequency inversion scrambling process by a duplicate set of scrambling/descrambling equipment.

Since it is relatively easy to descramble a secure audio signal inverted with a single inversion frequency with a tunable audio oscillator, greater security may be achieved by changing the inversion and reinversion frequencies to one or more other frequencies at a fixed or variable rate and in a pattern which is known by both the scrambler and descrambler portions of the system. Others have proposed storing a pseudo-random sequence of frequency hops in both the frequency inverter portion and the frequency reinverter portion of the scrambler to control the inversion and the reinversion frequency generators. This technique requires that a memory element be physically changed in units which are expected to be widely separated. That is, a mobile telephone unit would have to be called in to a centralized service facility to have its pseudo-random frequency hop pattern changed. Likewise, the other end of the scrambler system would require a memory change so that the remote radiotelephone unit and its conversing partner would be able to carry on a secure conversation. If the remote radiotelephone unit were expected to converse with more than one secure party, each of the parties would have to have their pseudo-random code memory physically modified in order to partake in a secure message conversation. Obviously this operation is not practical.

The present invention avoids these problems by establishing a pseudo-random hopping code at the initiation of any desired secure message. Furthermore, the present invention establishes a first pseudo-random pattern for messages traveling from the originating scrambler station and passing over one half of a duplex channel to an answering scrambling station and a second, separate pseudo-random hopping pattern for messages passing from the answering scrambler station to the originating scrambler station over the second half of the duplex channel.

Mere transmission of a short hopping pattern over an unsecure channel would not yield a particularly secure system if the pattern itself were conveyed over the channel. Therefore the present invention transmits a randomly generated digital number from the originating scrambler station to the answering scrambler station over one half of the unsecure duplex channel. The answering scrambler station generates another random digital number in response to the receipt of the digital number from the originating scrambler station and transmits the second random digital number to the originating scrambler station over the other half of the unsecure duplex channel. For convenience, the random digital number generated by the originating scrambler station will be called a TX seed and the random digital number generated by the answering scrambler station will be called a RX seed. The originating scrambler station utilizes both the TX seed and the RX seed to generate another binary number which may be cycled bit by bit and read at particular bit locations cycle by cycle to provide a unique encoding number. Such a cycling binary number is commonly known as a Rolling Code and may be read and cycled as shown in FIG. 5.

Figure 5:
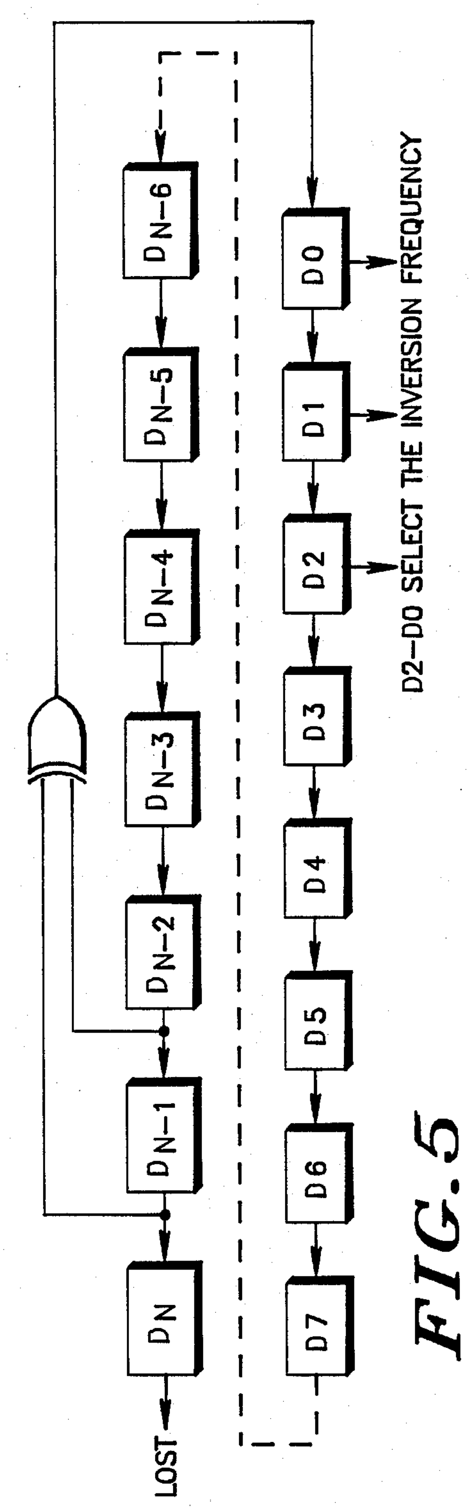
FIG. 5 is a block diagram of a rolling code generator which may be employed in the present invention.

FIG. 5 illustrates a means for reading a rolling code from a binary word generated from the TX seed and the RX seed and initially stored in a series of coupled bit storage locations like the bucket brigade shown. In the preferred embodiment bit storage locations D0, D1, and D2 are read at an appropriate time to select the inversion frequency to be used during a predetermined period of time. After the expiration of the predetermined time, the contents of each bit memory location are shifted to the next higher bit memory location with the output of the $D_{M-1}$ and the $D_{M-2}$ memory locations exclusively OR'd to regenerate the bit to be placed in the DO memory location. In the preferred embodiment, the state timing lasts 100 milliseconds, thus a new inversion frequency will be produced every 100 milliseconds. It is readily obvious that the three bits read from latches D0 through D2 can define up to 8 inversion frequencies. In the preferred embodiment, inversion frequencies are selected from a band of frequencies ranging from approximately 2600 Hz to 3500 Hz.

The originating scrambler station and the answering scrambler station each continuously generate separate random numbers. Each time the secure mode of operation is entered, one random number is seized by the originating scrambler station and used as a TX seed number by the originating scrambler station Similarly, another random number is seized by the answering scrambler station and used as an RX seed. Optionally if, the random number generated for the TX seed happens to equal the number selected for the RX seed, the initiation is considered invalid and new numbers may be selected. It is an important feature of the present invention that the automatic generation of the seeds by each scrambler unit relieves the burden of key management from the user, an improvement over present high security encryption systems.

The TX and RX seed numbers are used by the originating and answering scrambler stations to produce two independent rolling code numbers, one to start the pattern of frequency hops on the half of the duplex channel going from the originating scrambler station to the answering scrambler station (the forward channel) and another to start the pattern of frequency hops on the other half of the duplex channel going from the answering scrambler station to the originating scrambler station (the reverse channel). Each rolling code starting point number is loaded into a rolling code generator such as that of FIG. 5. In the preferred embodiment, the rolling code starting point values are generated in both the originating scrambler station and the answering scrambler station according to the following equations:

$$\text{TX START} = A^* (\text{TX seed} + B) + C^* (\text{RX seed} + D)$$

$$\text{RX START} = A^* (\text{RX seed} + B) + C^* (\text{TX seed} + D)$$

The originating scrambling station generator and the originating scrambling station reinversion rolling code generator each produce one of $2^{n-1}$ non-repeating codes each time the generator is updated (which is every 100 milliseconds in the preferred embodiment). A further process in the tone control prevents generating the same inversion frequency consecutively. This guarantees that a fixed inversion frequency attacker would hear clear audio in time intervals of no more than 100 milliseconds.

Figure 6:
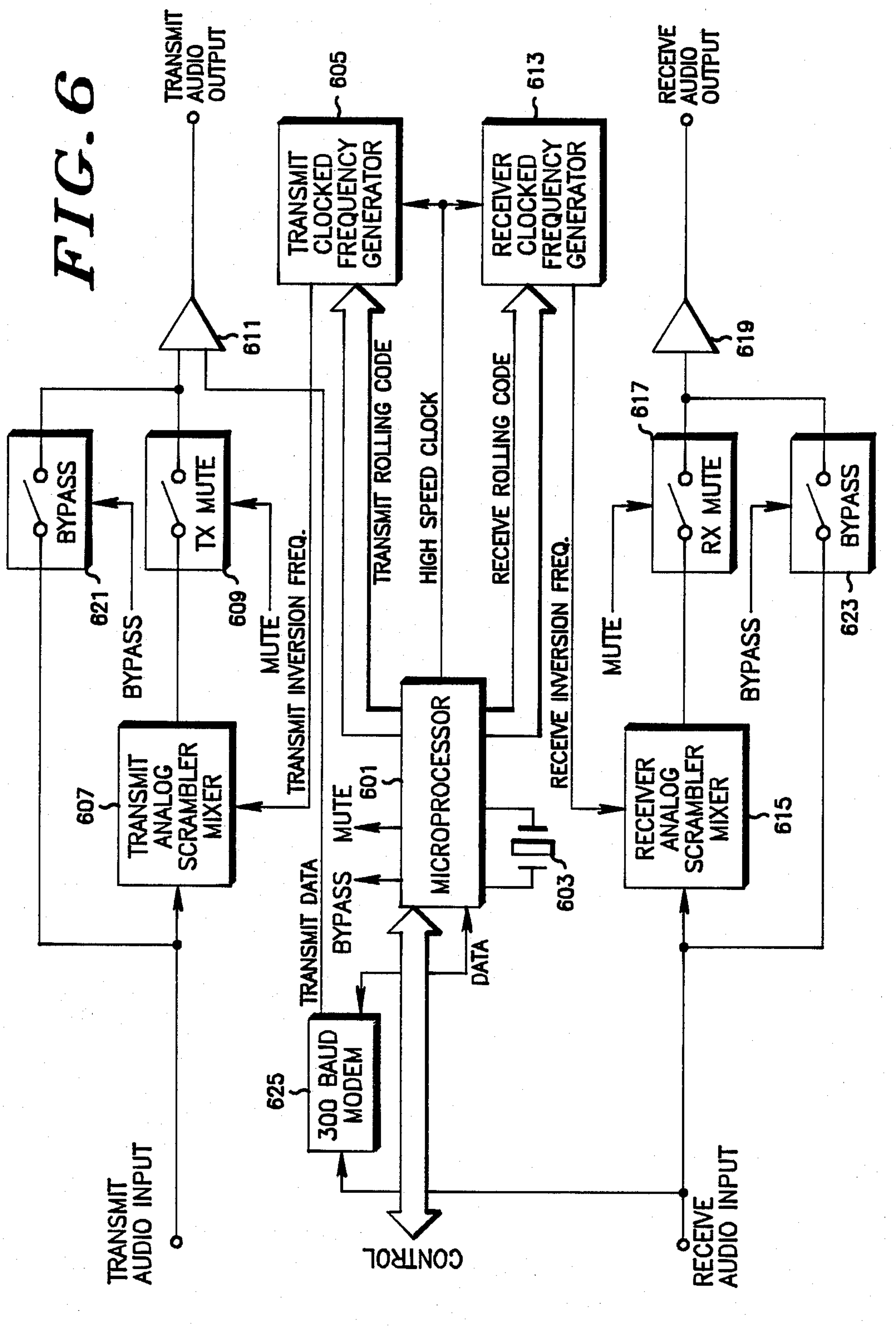
FIG. 6 is a block diagram of an inversion frequency hopping analog scrambler employing the present invention.

A scrambler station employing the present invention is shown in FIG. 6. The analog scrambler of the present invention utilizes essentially two independent audio paths defined as transmitter (TX) and receiver (RX) audio paths. The TX audio path accepts clear, unsecure audio signals frequency inverts the unsecure audio signal with one of a plurality of inversion frequencies for a period of time equal to approximately 100 milliseconds, before passing the secure audio signal to an output port and subsequently to one half of an unsecure duplex channel. The receive audio path accepts secure, frequency inverted audio on a RX audio in port, reinverts the inverted received audio signal, and passes the unsecure, unscrambled received audio to a utilization means. In the instance of a scrambler of the present invention used in a cellular mobile telephone, the TX audio output port is coupled to the radiotelephone transmitter and the RX audio input port is coupled to the transceiver receiver; the TX audio input port is coupled to a microphone and the RX audio output port is coupled to a speaker or earpiece.

It is important to note that the generator of the TX rolling code is the master rolling code generator which must be followed by the RX rolling code generator in another analog scrambler. That is to say, the TX rolling code frequency inversion generator of duplex analog scrambler 103 of FIG. 1 is the master rolling code frequency inversion generator and must be followed by the RX rolling code frequency inversion generator in duplex analog scrambler 107 of FIG. 1. Concurrently but independently, the RX rolling code generator of the analog scrambler of FIG. 6 is a slave rolling code generator following the TX rolling code of the analog scrambler which generates the RX audio input received from the reverse duplex channel. Again referring to FIG. 1, the duplex analog scrambler 107 provides the TX rolling code to which the RX rolling code of duplex analog scrambler 103 is a slave.

Referring again to FIG. 6, it can be seen that the operation of a scrambler station of the preferred embodiment is under the control of a microcomputer 601, which may be an 8-bit microprocessor such as a Motorola type MC6805 microprocessor or equivalent. The microcomputer 601 is clocked by a crystal controlled oscillator (shown as 603) to derive a frequency stable clock for inversion frequency stability and code synchronization. The microcomputer 601 and its internal associated memory performs the functions of: (a) continuously generating a random seed number for use in creating the TX rolling code starting number (b) generating the TX rolling code starting point binary number and generating the RX rolling code binary starting point number; (c) updating and outputting the TX rolling code and updating and outputting the RX rolling code while maintaining synchronization with the rolling codes at the far end receiving scrambler; and (d) and controlling the muting and bypass functions of the scrambler.

A 4-bit sample of the TX rolling code is output from microcomputer 601 on a 4 bit bus to a TX clocked frequency generator 605. (This 4-bit sample is mapped from a three bit frequency definition by the microcomputer 601). The TX clocked frequency generator 605 converts the four bit code from the bus into a TX inversion frequency signal which is applied to a TX analog scrambler mixer 607 to invert unsecure TX audio signal input. The TX analog scrambler mixer 607 may be implemented by using a Standard Microsystems Corporation COM 9046 commercially available analog scrambler or equivalent circuit. The frequency inverted TX audio signal is output from the TX analog scrambler mixer 607 to a TX muting switch 609 which is controlled by the microcomputer 601. The output from the TX mute switch 609 is applied to an amplifier 611 and output for transmission as a secure signal on an unsecured duplex channel. Similarly, the RX rolling code is output on a four bit bus to an RX clocked frequency generator 613 for conversion to the appropriate RX inversion frequency signal and for application to one port of the RX analog scrambler mixer 615. The secure, frequency inverted RX audio input signal is applied to another port of the RX analog scrambler mixer 615 for reinversion in accordance with the RX inversion frequency signal and output to a RX received mute switch 617 (which is also controlled by the microcomputer 601). The output from the RX mute switch 617 is amplified by amplifier 619 and output as an unsecured RX received audio output signal for use by a telephone handset receiver or a speaker. Both the TX analog scrambler mixer 607 and the RX analog scrambler mixer 615 may be bypassed upon command of the microcomputer 601 via bypass switches 621 and 623, respectively, when clear audio is to be transmitted and received.

In order that the microcomputer 601 be enabled to communicate with the microcomputer in the scrambler station at the far end, a modem 625 accepts data from the microcomputer 601 for transmission to the far end analog scrambler microcomputer and accepts data from the far end microcomputer for presentation to the microcomputer 601. In the preferred embodiment, modem 625 is a 300 BAUD modem such as a National Semiconductor 74HC943 or equivalent modem.

Figure 7:
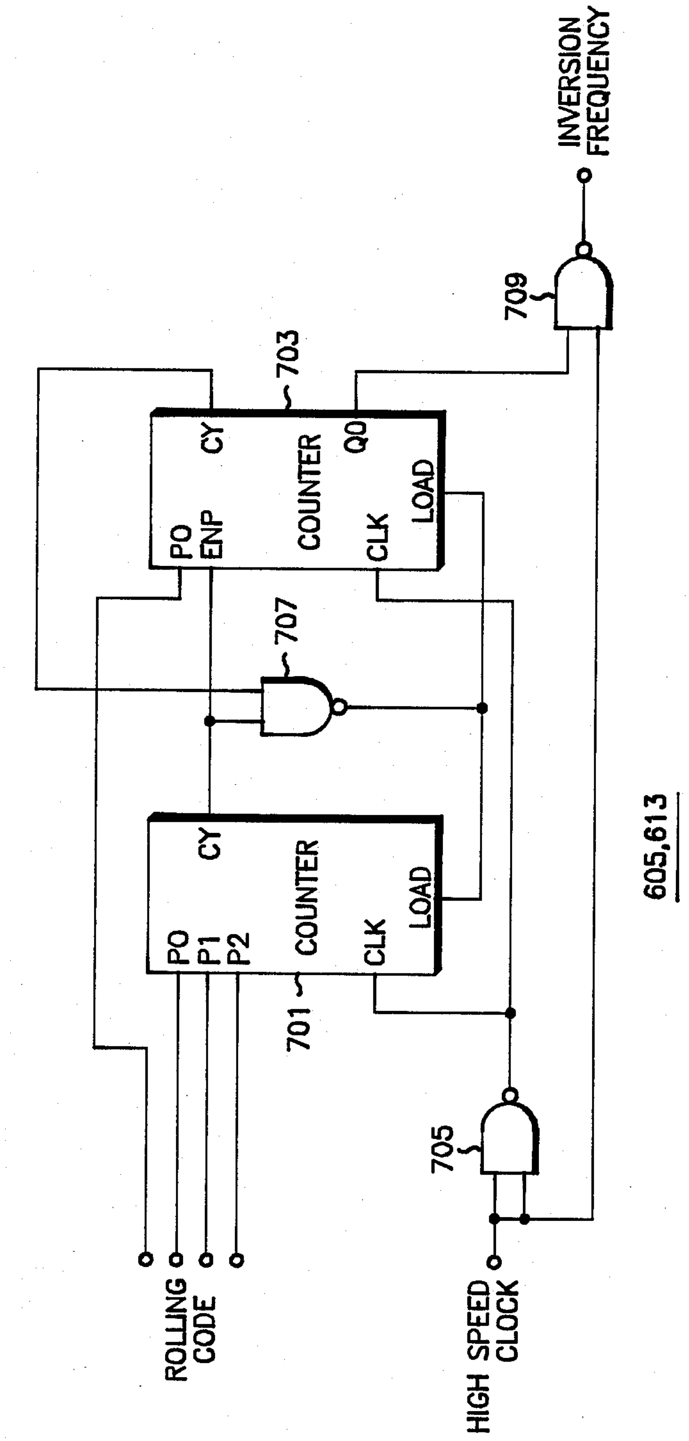
FIG. 7 is a block diagram of a clocked frequency generator which may be employed by the present invention.

The block diagram of FIG. 7 further describes the TX clocked frequency generator 605 or the RX clocked frequency generator 613. The rolling code sample is input on a four bit bus to the P0, P1, and P2 inputs of a four bit binary counter with synchronous preset, 701, such as a Motorola type 74HC163 or equivalent. One bit of the four bit bus is applied to the P0 input of a second four bit binary counter 703, which may also be a Motorola type 74HC163. The counters 701 and 703 operate as an inversion frequency gate when clocked with the high speed clock from the microcomputer 601 and disable the NAND gate 709 after counting a number between 16 and 32 defined by the 4-bit input. Thus, a square wave output having a duty cycle determined by the input rolling code is output from the Q0 terminal of the four bit binary counter 703, to control the high speed clock by NAND gate 709, and output as the inversion frequency signal for use by the appropriate analog scrambler mixer.

Figure 10:
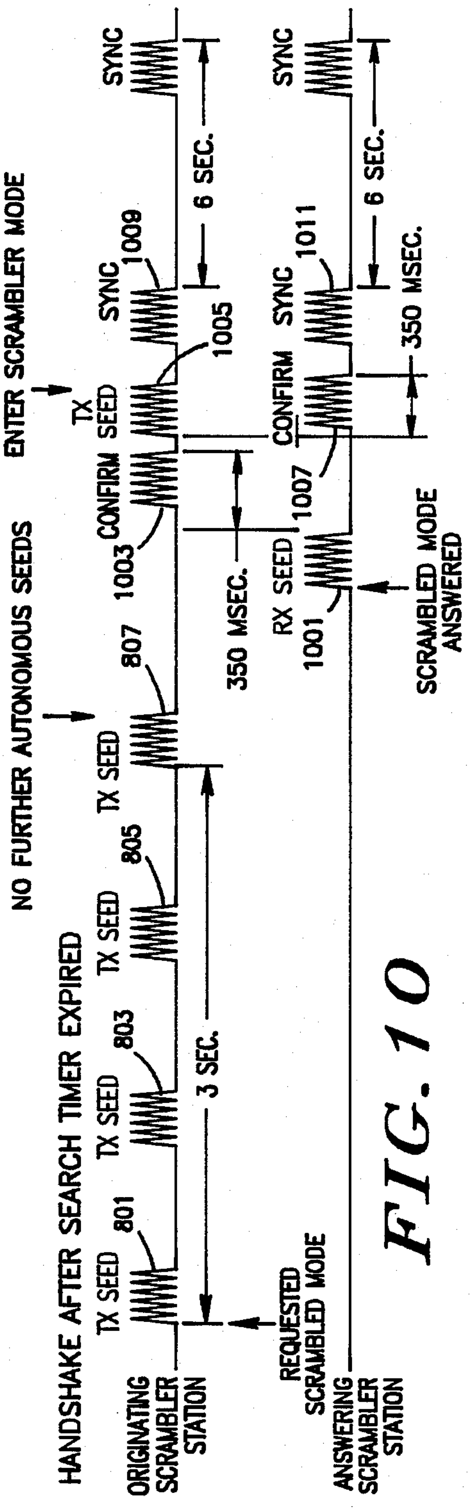
FIG. 10 is a timing diagram of a handshake after the search timer has expired in the originating scrambler station employing the present invention.
Figure 11:
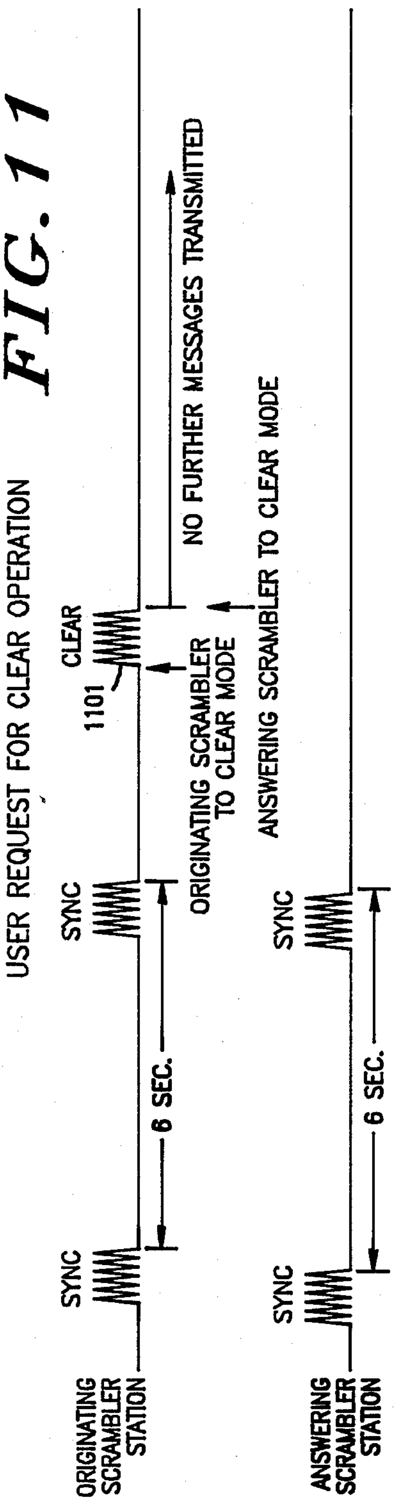
FIG. 11 is a timing diagram of a user request for clear mode operation from an originating scrambler station employing the present invention.
Figure 12:
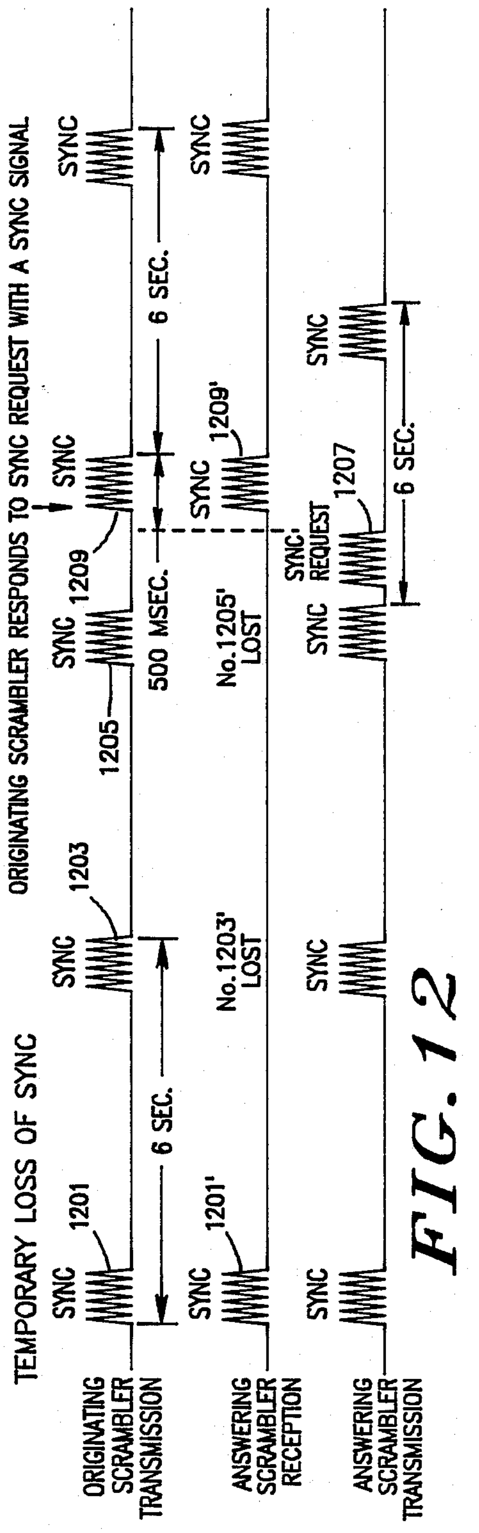
FIG. 12 is a timing diagram of scrambler operation during a temporary loss of synchronizing signals in accordance with the present invention.
Figure 13:
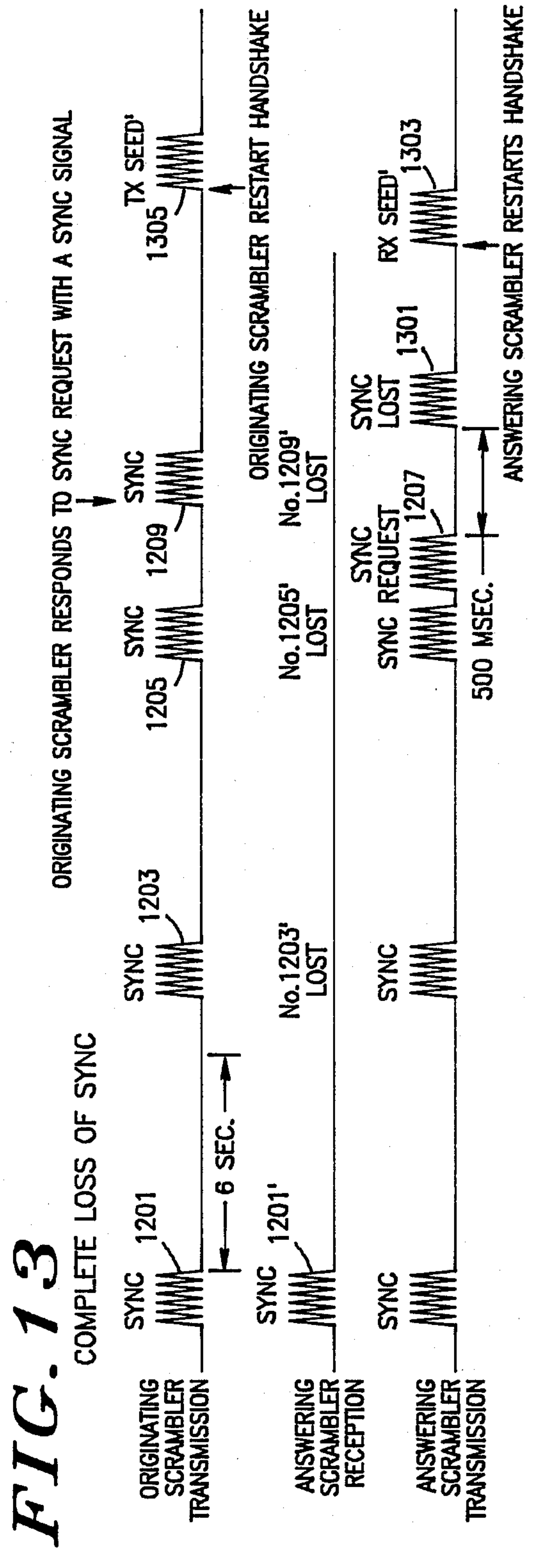
FIG. 13 is a timing diagram of scrambler operation after complete loss of synchronization in accordance with the present invention.

FIGS. 8 through 13 describe system operation by way of timing diagrams. The exchange of TX seeds and RX seeds in an origination of scrambled mode and a clearing of the scrambled mode is shown in FIGS. 8, 9, 10, and 11. System operation during the loss of synchronization either by channel fading or by handoff is shown in FIGS. 12 and 13.

Figure 8:
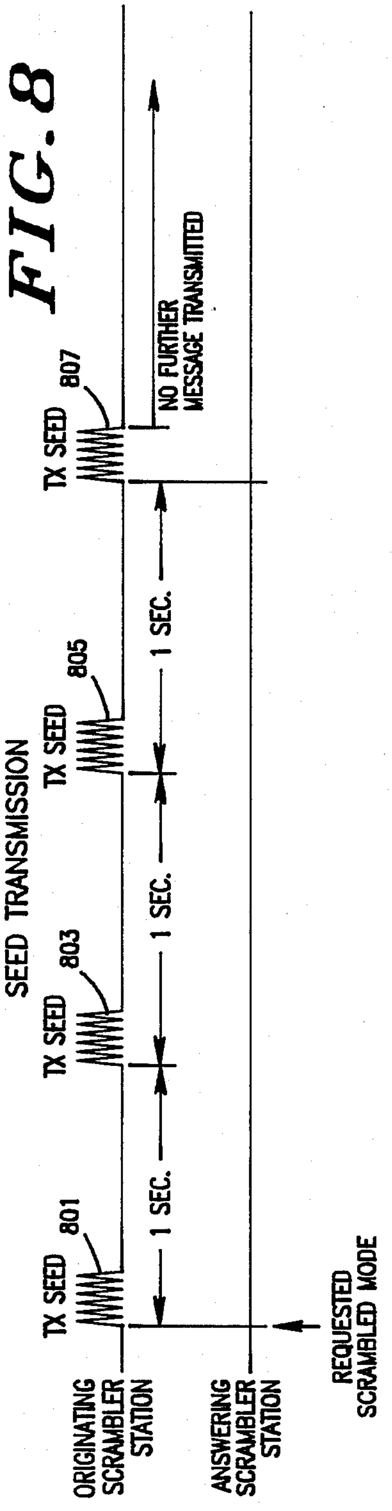
FIG. 8 is a timing diagram of an attempted seed transmission by an originating scrambler employing the present invention.

When the scrambled mode is requested, as in FIG. 8, the originating scrambler station transmits a message at 300 BAUD containing the randomly generated TX seed number (801). After a predetermined period of time, which in the preferred embodiment is one second, a second transmission of the TX seed number occurs (803). Two additional attempts at conveying the TX seed are made at one second intervals (805, 807) and, if no response is received from an answering scrambling station, a search timer (searching for an answering scrambler station) is allowed to expire and no further seed transmissions are made.

Figure 9:
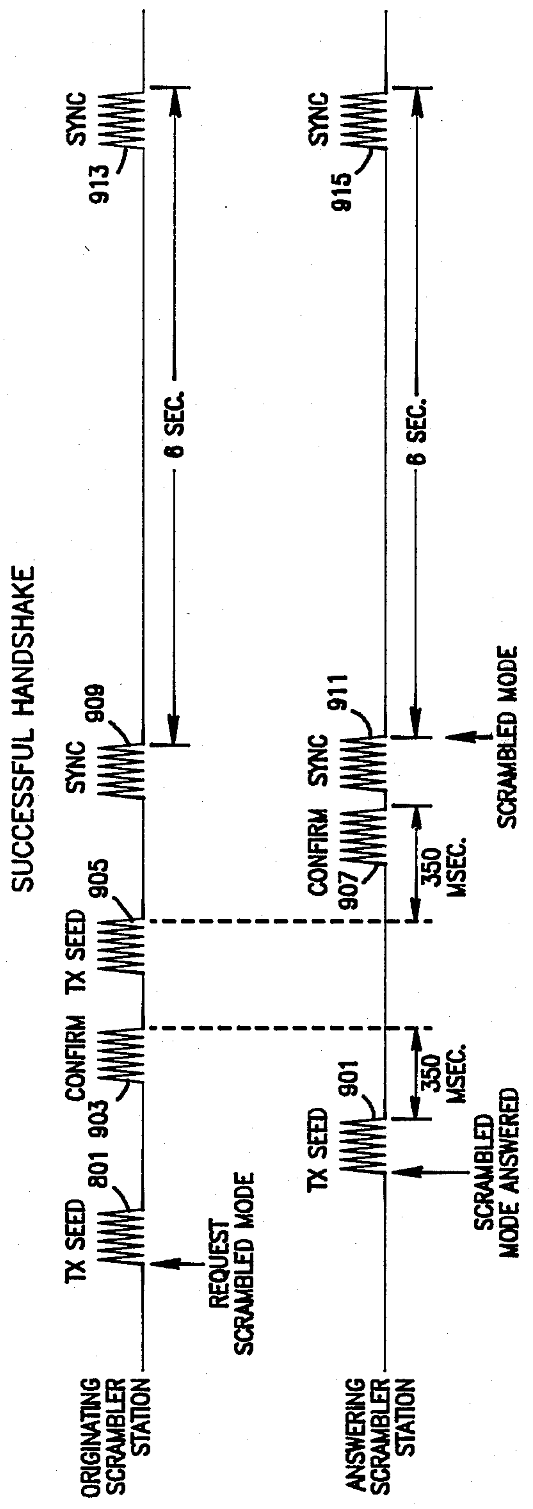
FIG. 9 is a timing diagram of a successful handshake of TX seeds and RX seeds by an originating and an answering scrambler station employing the present invention.

If, however, an answering scrambler station responds to the TX seed 801, as shown in FIG. 9, a handshake exchange of TX seeds and RX seeds are performed. The requested scrambled mode is answered by the answering scrambler station with a RX seed 901. The originating scrambler station acknowledges the transmission of the answering scrambling station with a confirmation message 903 containing a repetition of the RX seed number and which, in the preferred embodiment, must occur within 350 milliseconds from the end of the RX seed number transmission 901. Following the originating scrambler station transmission of the confirmation message 903, a second transmission of the TX seed number occurs at 905 on the forward half of the duplex channel followed within 350 milliseconds by a confirmation message 907 (containing a repeat of the TX seed number) by the answering scrambler station on the reverse half of the duplex channel. Following the confirmation message 907, a transmission of a synchronizing signal from both the originating scrambler station and the answering scrambler station occurs (909 and 911, respectively) at essentially the same time. Although propagation times may shift the absolute starting points of the synchronization (sync) signals, the actual time of shifting is small relative to the duration of the sync signal. The major purpose of the sync signal is to align the RX rolling code generator at the answering station with the TX rolling code generator at the originating station. Since the hopping of the inversion frequency from the originating scrambler station is subject to the same propagation delay as the synchronizing signal, no detrimental effect is realized at the answering scrambler station. Similarly, the synchronization signal from the answering scrambler station aligns the RX rolling code generator at the originating scrambler station to the TX rolling code generator at the answering scrambler station and is likewise subject to the same propagation delay as the scrambled signal. It is beneficial, however, that the synchronization signals be essentially aligned with each other in each path of the duplex channel in order that echoes which may be present in both the originating scrambler station and the answering scrambler station at the unsecure audio interface be essentially suppressed. Each synchronization signal from the originating scrambler station and the answering scrambler station is repeated, in the preferred embodiment, every six seconds as shown as sync pulses 913 and 915 in FIG. 9. During this six second interval, the transmission of hopped frequency inverted secured audio may be transmitted on one or both halves of the duplex channel. During each sync signal, the audio is muted for a brief period so that the sync signal may be transmitted without interference.

If the answering scrambler station responds to the originating scrambler station transmission of TX seeds after the fourth TX seed transmission 807, the handshake may be completed even though the search timer has expired and no further autonomous TX seeds are transmitted from the originating scrambler station. In some instances, delay in call completion may take longer than the three seconds of originating scrambler station TX seed transmission. The scrambling station may, in the preferred embodiment, be placed in the scrambled mode and, when called, respond with a sequence of four RX seed transmissions as a handshake sequence of an answering scrambling station. Thus, as shown in FIG. 10, the answering scrambler station initiates the scrambled mode with an RX seed 1001 on the reverse half of the duplex channel. The originating scrambler station responds with a confirmation message (with a repeat of the RX seed number) 1003 on the forward duplex channel followed immediately by a TX seed 1005. If the answering scrambler station responds with a confirmation message 1007 within 350 milliseconds of the end of the TX seed 1005, the scrambled mode of operation will be entered following the essentially simultaneous sync signals 1009 and 1011. The standard scrambled mode, in which synchronization signals are transmitted every six seconds is then entered.

To return to the clear mode of speech transmission on the unsecure duplex channel, a clear message 1101 is transmitted by the originating scrambler station as shown in FIG. 11. At the conclusion of the clear message 1101, the answering scrambler enters the clear mode and no further frequency inversion of the audio is provided. A similar clear message may be originated by the answering scrambler station to return the system to clear speech operation.

If the synchronization is temporarily lost, such as during a channel fade or a handoff, the digital mode of operation will be automatically recovered by the scramblers of the present invention. The originating scrambler station transmits its sync signal every six seconds as shown by sync signals 1201, 1203, and 1205 in FIG. 12. The answering scrambler, however, receives the synchronization signals shown in the second line of FIG. 12 as synchronizing signal 1201′ and as missing synchronization signals 1203′ and 1205′. Both the answering scrambler station and the originating scrambler station, since their scrambling operation is controlled by a stable oscillator, each are capable of free-running through at least two missed synchronization signals without noticeable degradation of synchronization. When a synchronization signal is missed, each scrambler will allow its rolling code generators to continue to update at the 100 millisecond rate. Following the missing of the second synchronization message (1205′) the answering scrambler inserts a sync request message 1207 in its normal transmissions on the reverse half of the duplex channel. The originating scrambler station receives the sync request 1207 and responds with a sync signal 1209 which is received by the answering scrambler as 1209′. Synchronization therefore has been reestablished on the forward half of the duplex channel but at a time which is not coincident with the synchronization signals transmitted by the answering scrambler on the reverse half of the duplex channel. The same process will occur if the synchronization is not received by the originating scrambler station.

If, as shown in FIG. 13, the answering scrambler does not receive the originating scrambler station synchronization signal response 1209, the answering scrambler transmits a synchronization lost message 1301 on the reverse half of the duplex channel thereby informing the originating scrambler station that synchronization has been lost and an automatic attempt at resynchronization has not been successful. Both originating and answering scrambler stations default to clear message transmission and a new scrambling handshake is automatically attempted with the answering scrambler station transmitting a new RX seed number 1303. The originating scrambling station transmits a new TX seed at 1305 and the handshake process begins.

Figure 14:
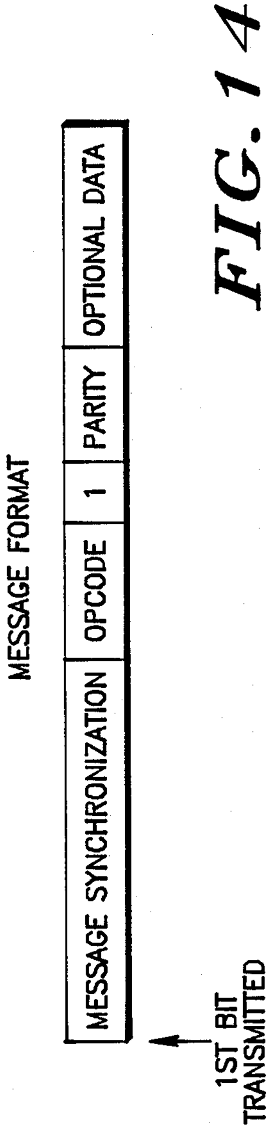
FIG. 14 is a diagram of the message format which may be employed by the present invention.

FIG. 14 illustrates a typical message format which may be used in the present invention. Following the message synchronization pattern, a series of bits are employed to define a particular message type being transmitted. Among these message types are the synchronization signal, the confirmation message, the TX/RX seed, a synchronization request message, a synchronization loss message, and a clear message. The optional data field may be used with those messages which require additional data, for example, the seed number.

The process by which the microcomputer in a analog scrambler unit employing the present invention achieves its system operation is shown in the flowcharts of FIG. 15A through FIG. 15F. Upon a request to enter the scrambled mode, the process first seizes a number from a random seed number generator of the microcomputer 601 (at 1501) and starts a search timer at 1503. This random seed number is transmitted as a TX seed at 1505 and the process awaits the reception of a confirmation message from the answering scrambler station by starting a confirmation message timer at 1507 and waiting for the timer to expire as determined by the loop including decision block 1509. If the confirmation timer expires without a confirmation being received, the TX seed flags are cleared at 1511 and a determination of whether the search timer has timed out is made at decision block 1513. If the search timer has not timed out, the transmission of the TX seed process (starting at block 1505) is reentered at every integer second through three seconds as determined by decision block 1515.

Figure 15A:
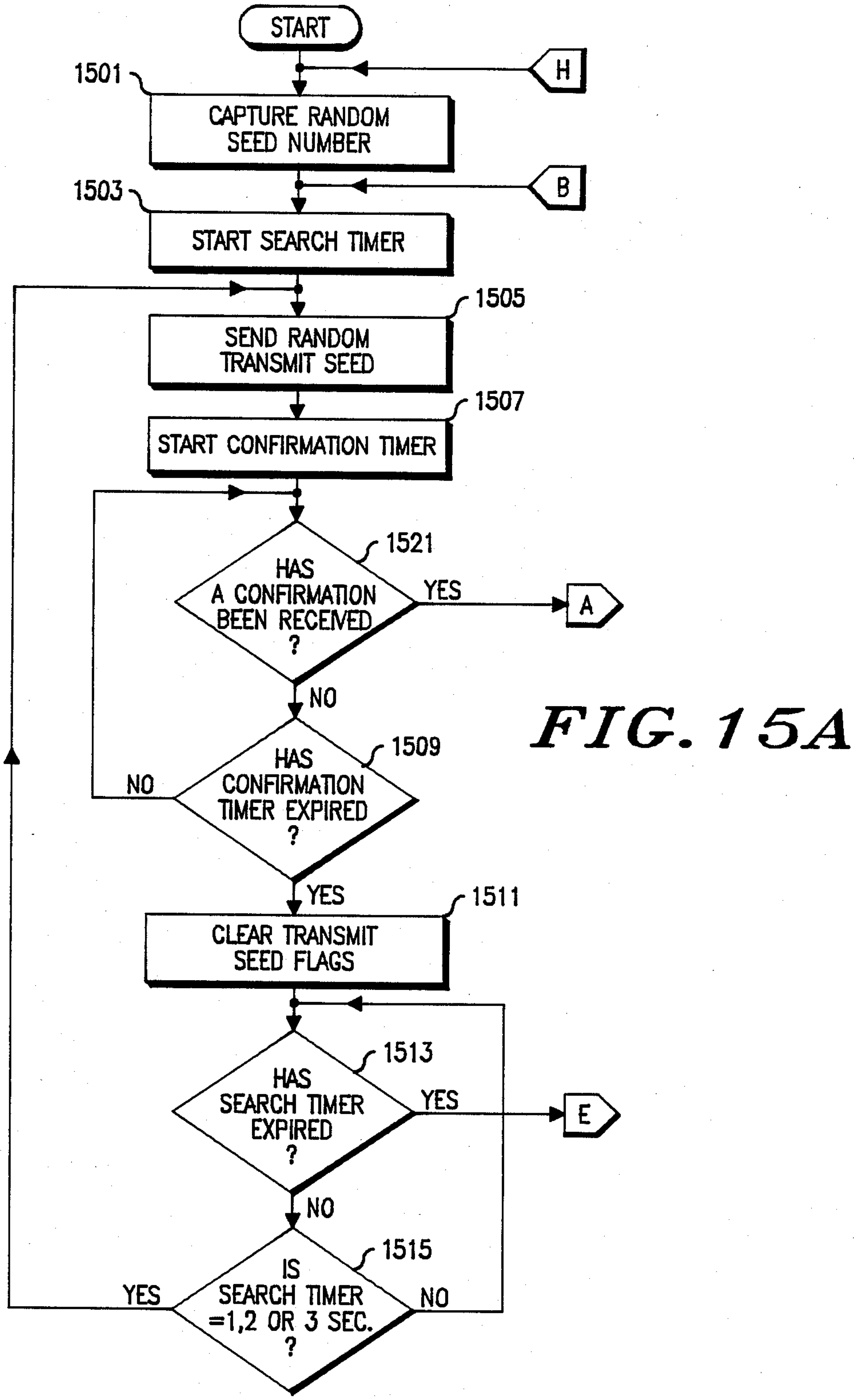
FIGS. 15A through 15F are a flowchart of the initialization handshake, synchronization process, and encoding process employed in the present invention.
Figure 15B:
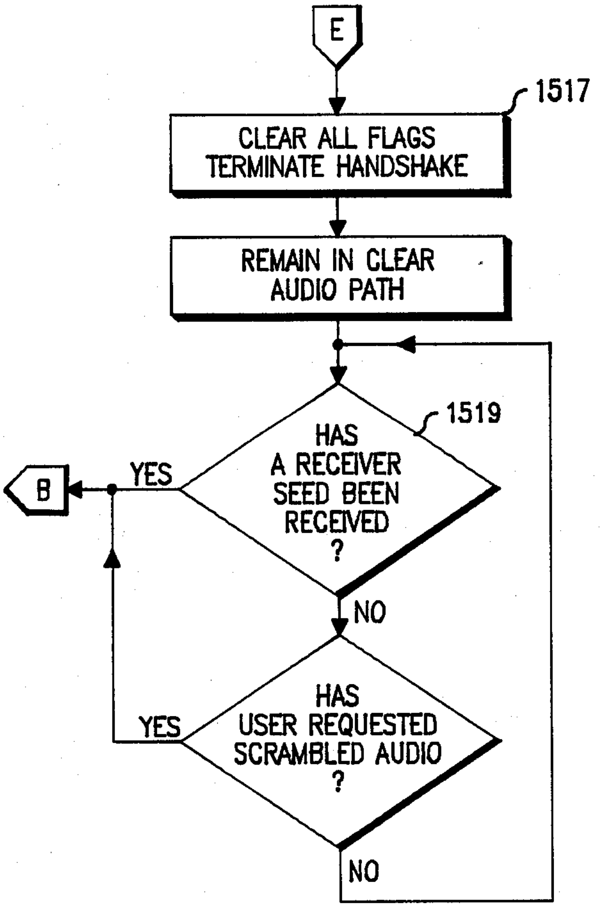

If the search timer times out (at 1513) without a confirmation message being received, the process clears all scrambling origination flags and terminates the handshake process at 1517 of FIG. 15B. However, if the answering scrambling station delays its response to the TX seed message beyond the search timer expiration time, but then transmits a RX seed which is received by the originating scrambling station at 1519, the process returns to the start search timer block of the handshake process at 1503.

Figure 15C:
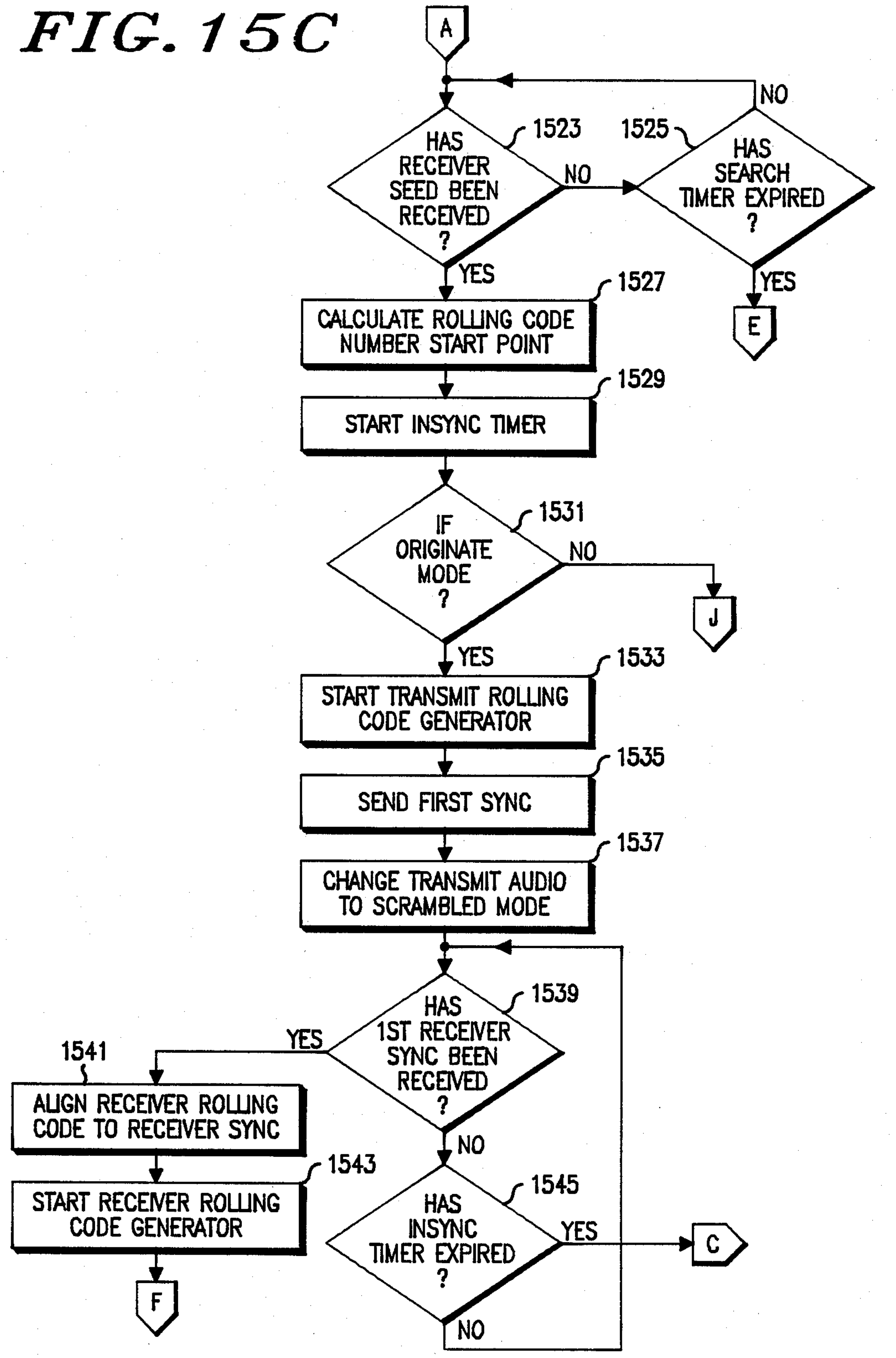
Figure 15D:
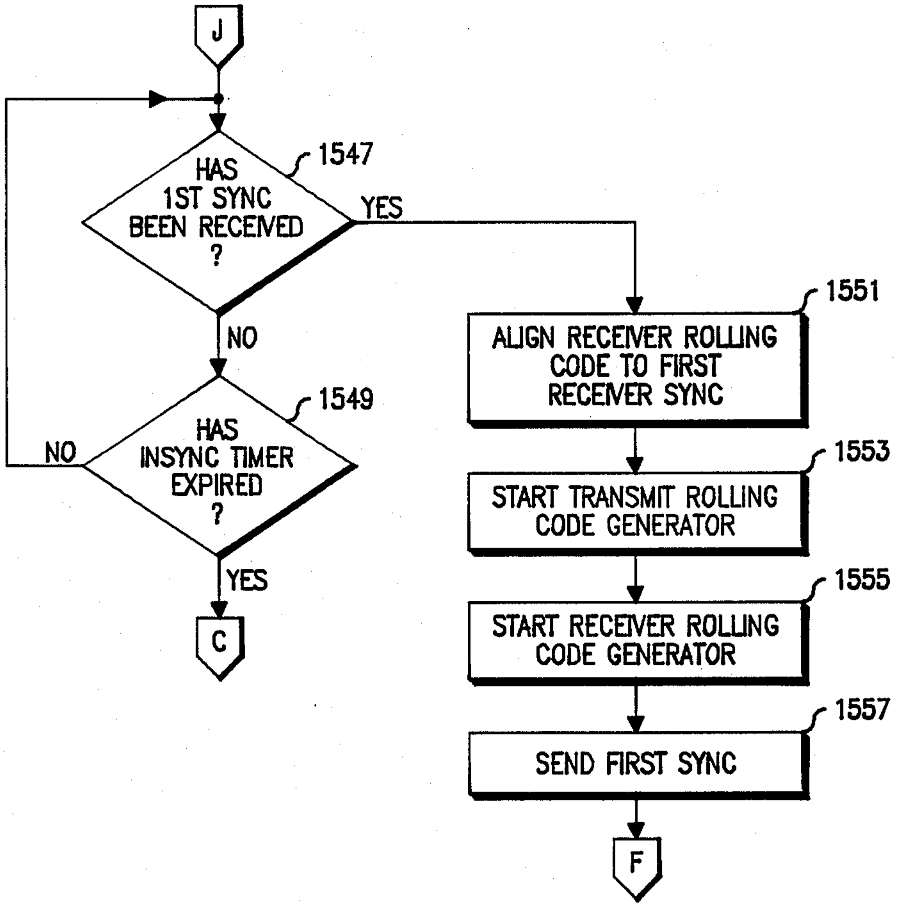
Figure 15E:
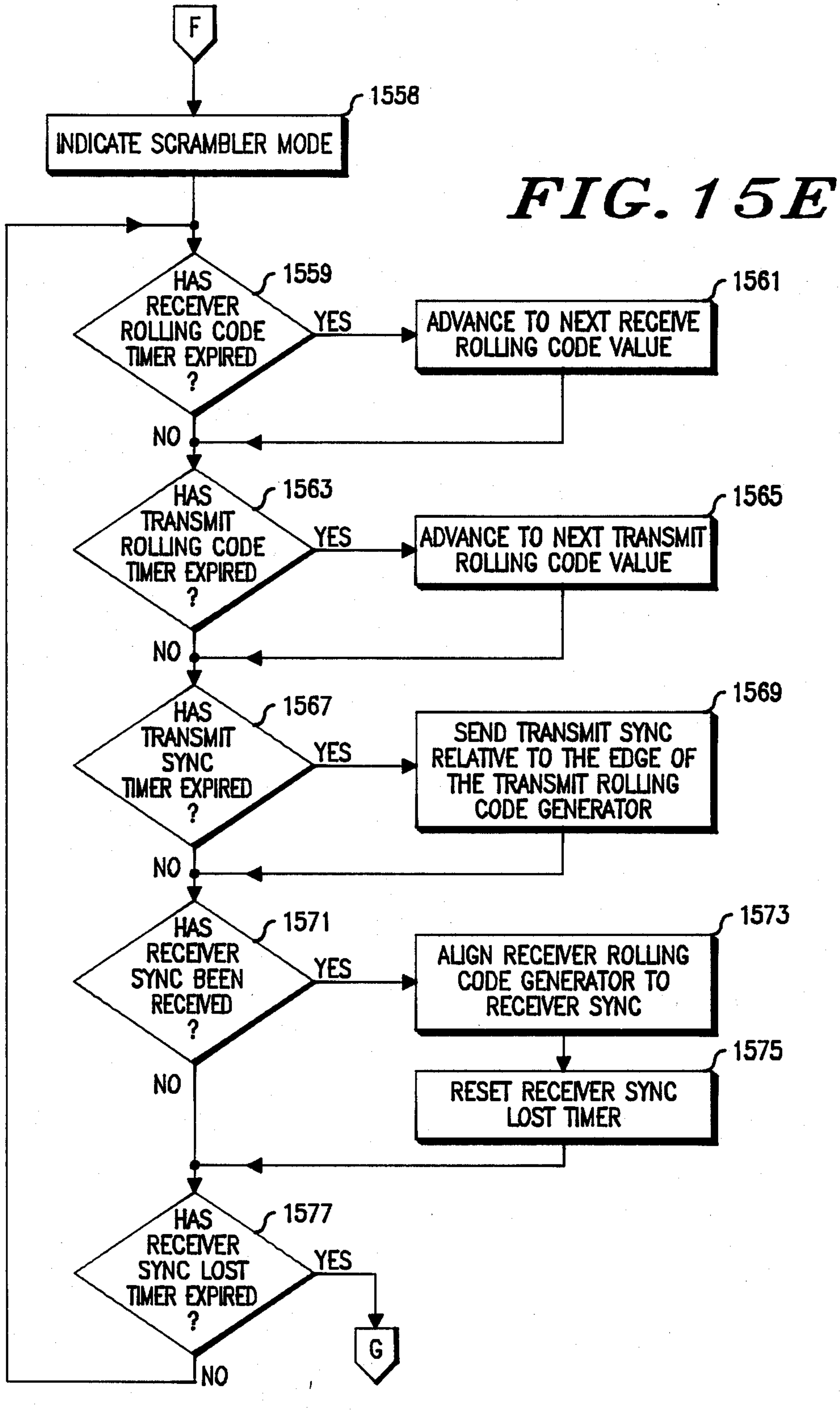

If a confirmation message has been received from the answering scrambling station, as determined at block 1521 of FIG. 15A, the process awaits the reception of a RX seed from the answering station at block 1523 of FIG. 15C. If the search timer has expired before a RX seed is received (as determined at block 1525) the handshake process is terminated and all flags are cleared by the entry of block 1517. If a RX seed has been timely received, the rolling code number starting points are calculated at block 1527 in accordance with the previously mentioned equations. The INSYNC timer is started at block 1529 and a determination is made of whether the process should follow the originating scrambling station format or the answering station format at block 1531. Assuming that this is the originating scrambler scrambling station, the TX rolling code generator is started at block 1533. The first synchronization signal is transmitted at 1535 and the TX audio signal is switched to the scrambled mode at 1537. When the first RX sync signal is received, as determined at block 1539, the originating scrambler station RX rolling code is aligned to the RX sync signal at 1541 and the RX rolling code generator is started at 1543 before entering the steady state synchronization process. If the INSYNC timer expires before the first RX sync signal is received, as determined at block 1545, a sync loss message is transmitted as shown in block 1546 on FIG. 15F. If the origination mode determination (block 1531 on FIG. 15C) indicates this station is an answering scrambling station, a determination is made whether the first synchronization signal has been received before the INSYNC timer has expired at blocks 1547 and 1549 of FIG. If the INSYNC timer has expired before the first sync signal has been received the sync lost message is transmitted as shown in block 1546 of FIG. 15F. If the first sync signal has been timely received, the answering scrambling station process flow aligns the answering RX rolling code to the first synchronization signal at 1551. The answering scrambling station TX rolling code generator is started at 1553 and the answering scrambling station RX rolling code generator is started at 1555 before the first answering scrambling station synchronization signal is transmitted at 1557. The steady state transmission of scrambled audio and synchronization may then be entered.

Figure 15F:
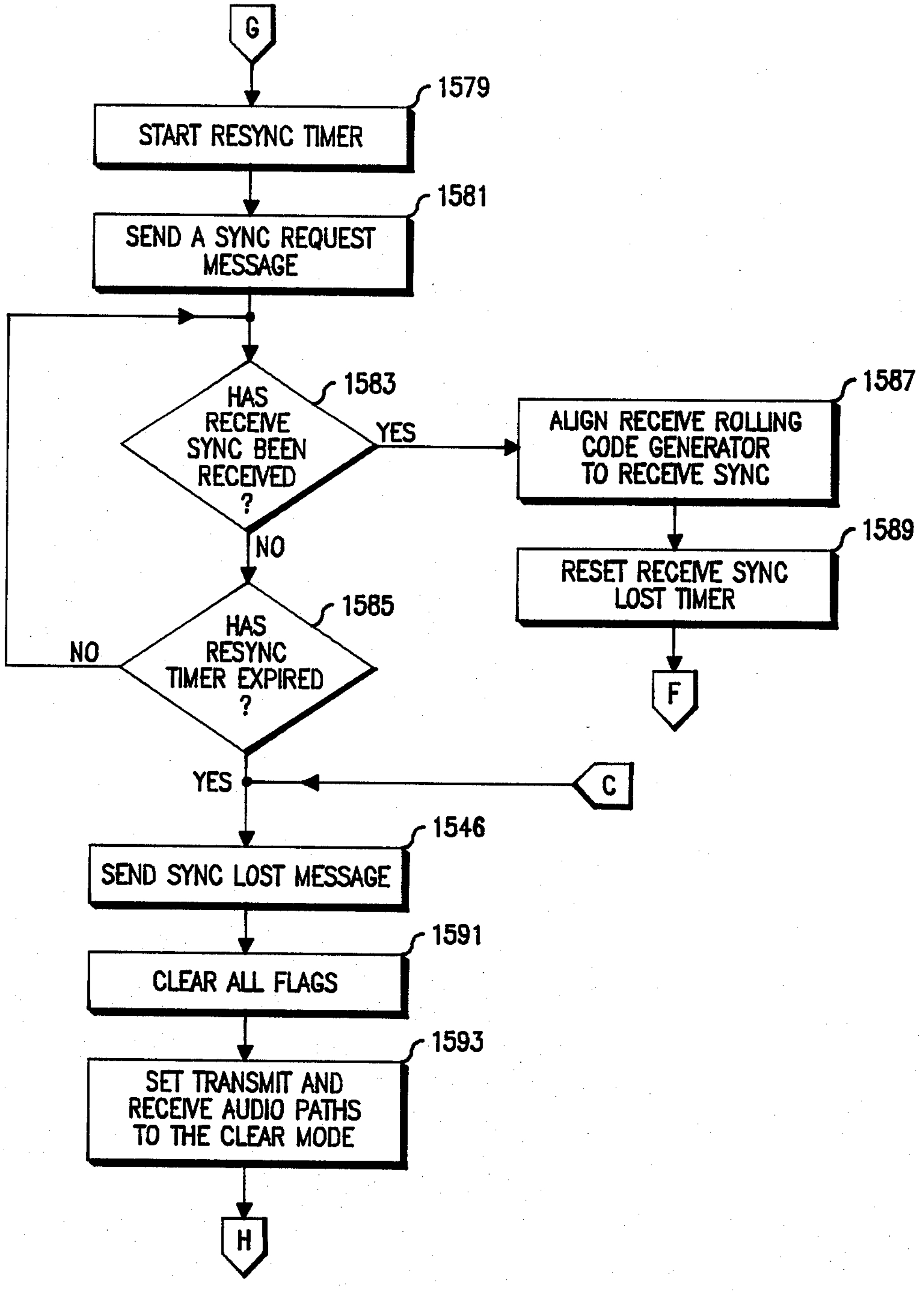

Steady state synchronization of the rolling codes for either the originating scrambling station or the answering scrambling station is shown in the process of FIG. 15F. The synchronized state is first entered with an indication presented to the user that a scrambled call is in progress (at 1558). In a cellular radiotelephone, the control unit handset 309 typically utilizes a display (not shown) which has the capability of displaying the word SCRAM when in the scrambled mode and CLEAR when not scrambled. If the handset does not have a display, a single LED may be used to indicate the scrambled mode. When the RX rolling code timer (set to 100 milliseconds in the preferred embodiment) has expired as determined at block 1559, the RX rolling code value is advanced at 1561. Likewise, when the TX rolling code timer expires as determined at block 1563, the next TX rolling code value is established at block 1565. When the TX sync timer has expired, a synchronization signal is transmitted marking the beginning edge of the TX rolling code generator transition, as shown by blocks 1567 and 1569. When the RX sync signal has been received, the RX rolling code generator is aligned to the RX sync signal at 1571 and 1573 and the RX sync loss timer is reset at 1575. A determination is made whether the RX sync loss timer has expired (at 1577) and if the timer has not expired, the steady state sync process begins again at block 1559.

If a determination is made that a sync signal has been missed, the resync timer is started at block 1579 in FIG. 15F. A sync request message is transmitted at block 1581 and the process awaits a responsive RX sync signal before the resync timer times out (as determined by blocks 1583 and 1585). If the RX sync signal is received in time, the RX rolling code generator is realigned to the RX sync signal, at 1587, and the RX sync loss timer is reset at 1589 before the process returns to the steady state synchronization starting at block 1559. If the resync timer expires before a RX sync signal has been received, a synchronization lost message is transmitted at block 1546 all flags are cleared at block 1591 and both the transmit and receiver audio paths are set to the clear audio mode at block 1593. An attempt to re-establish secure communications will then be started at block 1501.

Figure 16:
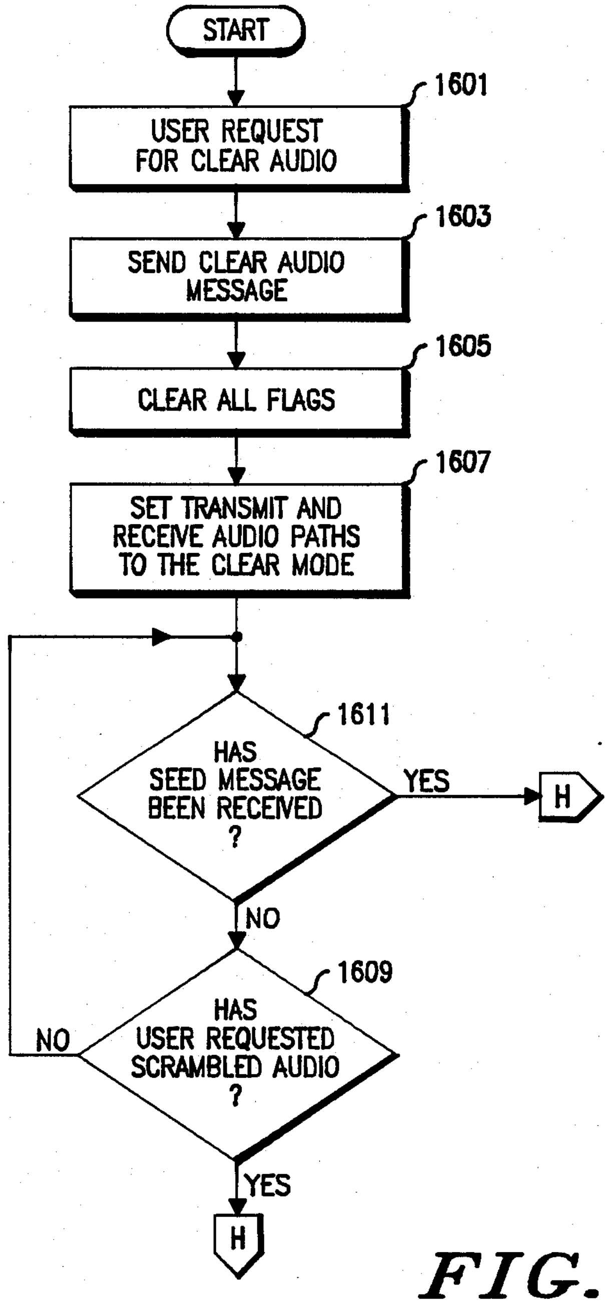
FIG. 16 is a flowchart of the user request of service process employed in the present invention.

When the user requests the scrambling station to return to the clear audio mode, as shown in FIG. 16, the process detects the user request at block 1601. A clear audio message is transmitted on one half of the duplex channel, at 1603, all flags are cleared at 1605, and both the transmit and receive audio paths are set to the clear audio mode at block 1607. The process then goes into a waiting mode until the user requests scrambled audio (at block 1609), or a reception of a seed message occurs (at block 1611). Either occurrence causes the process to enter the random seed capture process of block 1501 of FIG. 15A.

In summary, then, an analog inversion frequency hopping scrambler has been shown and described. The scrambler initializes the scrambling process by exchanging seeds between the originating scrambler station, which generates a random number TX seed, and the answering scrambler station, which generates a random number RX seed. The originating scrambler utilizes its TX seed and the RX seed received from the answering scrambler station to calculate the starting point values of a rolling code generator which is used to create the pattern of frequency hopping utilized to frequency invert the message to be transmitted. The originating scrambler also utilizes the TX seed and the RX seed to calculate the starting point values for a second rolling code generator used to create the frequency hopping pattern for the frequency reinversion of a received scrambled message. The answering scrambler likewise generates identical codes so that communication may occur. Synchronization between the rolling codes is maintained via synchronization signals transmitted every six seconds during mutes of the transmitted and received scrambled audio. Synchronization is transmitted simultaneously to avoid echoes. Therefore, while a particular embodiment of the invention has been shown and described, it should be understood that the invention is not limited thereto since modifications unrelated to the true spirit and scope of the invention may be made by those skilled in the art. It is therefore contemplated to cover the present invention and any and all such modifications by the claims of the present invention.

We claim:

1. An analog audio frequency band scrambler which provides security of communications over a communications channel by sequentially frequency inverting an unsecure first message for transmission as a secure first message on the channel to a second analog audio frequency band scrambler and by sequentially frequency reinverting a secure second message received from the second scrambler on the channel, the scrambler comprising:

means for exchanging a first seed number for a second seed number with the second scrambler;

means for generating from said exchanged first and second seed numbers a first code, at least part of which starts the sequential frequency inverting of the unsecure first message and a second code, at least part of which starts the sequential frequency reinverting of the secure second message; and means for transmitting a first code synchronization signal on the channel and for receiving a second code synchronization signal from the channel whereby frequency reinverting of the secure first message at the second scrambler may be synchronized to said first code synchronization signal and said second code may be synchronized to said second code synchronization signal.

2. An analog audio frequency band scrambler in accordance with claim 1 wherein said means for exchanging further comprises means for generating said first seed number and for transmitting said first seed number in a first message burst on the channel.

3. An analog audio frequency band scrambler in accordance with claim 1 wherein said means for exchanging further comprises means for receiving said second seed number from the channel.

4. An analog audio frequency band scrambler in accordance with claim 3 wherein said means for generating further comprises means for arithmetically combining said first seed number, said second seed number, at least one additive number, and at least one predetermined multiplication factor to generate said first code.

5. An analog audio frequency band scrambler in accordance with claim 4 wherein said means for generating further comprises means for reading predetermined digits of said first code and shifting said code at intervals of time whereby a rolling code is created to further sequence the sequential frequency inversion.

6. An analog audio frequency band scrambler in accordance with claim 3 wherein said means for generating further comprises means for arithmetically combining said first seed number, said second seed number, at least one additive number, and at least one predetermined multiplication factor to generate said second code.

7. An analog audio frequency band scrambler in accordance with claim 6 wherein said means for generating further comprises means for reading predetermined digits of said second code and shifting said code at intervals of time whereby a rolling code is created to further sequence the sequential frequency reinversion.

8. An analog audio frequency band scrambler in accordance with claim 2 wherein said means for transmitting a first code synchronization signal further comprises means for confirming reception of said second seed number and means for transmitting said first seed number in a second message burst prior to transmission of said first code synchronization signal.

9. An analog audio frequency band scrambler in accordance with claim 1 further comprising means for synchronizing said second code to an internal clock signal if said second code synchronization signal is not received from the channel.

10. An analog audio frequency band scrambler in accordance with claim 1 further comprising means for coordinating said first code synchronization signal and said second code synchronization signal whereby said first code synchronization signal and said second code synchronization signal occur essentially simultaneously.

11. An analog audio frequency band scrambler in accordance with claim 1 further comprising means for muting said secure first message during said transmission of said first code synchronization signal.

12. An analog audio frequency band scrambler in accordance with claim 1 further comprising means for indicating said means for transmitting a first code synchronization signal and for receiving a second code synchronization signal have commenced operation.

13. An analog audio frequency band scrambler in accordance with claim 5 further comprising means for determining whether sequential rolling code numbers are equal and for ignoring a second code number equal to an adjacent first code number.

14. An analog audio frequency band scrambler in accordance with claim 1 further comprising means at the second scrambler for receiving said first code synchronization signal and for transmitting a synchronization request signal if said first code synchronization signal is not received.

15. An analog audio frequency band scrambler in accordance with claim 14 further comprising means at the scrambler for detecting said synchronization request signal and for transmitting a third code synchronization signal on the channel in response to said synchronization request signal detection.

16. An analog audio frequency band scrambler in accordance with claim 15 further comprising means at the second scrambler for receiving said third code synchronization signal and for transmitting a synchronization lost signal if said third code synchronization signal is not received, thereby terminating the frequency inverting of the unsecure first message.

17. An analog frequency scrambler in accordance with claim 16 further comprising means at said second scrambler for transmitting a third seed number whereby the frequency inverting of the unsecure first message may be started.

18. An analog frequency scrambler in accordance with claim 14 wherein the communications channel is a duplex radio channel over which the scrambler may transmit in a first direction said first seed number, said first code synchronization signal, and the secure first message and from which the scrambler may receive from a second direction said second seed number, said second code synchronization signal, and the secure second message.

19. A method of providing security of communications over a narrow bandwidth channel by sequentially frequency inverting an unsecure first message for transmission as a secure first message on the channel to a second analog audio frequency band scrambler and by sequentially frequency reinverting a secure second message received from the second scrambler on the channel, the method comprising the steps of:

exchanging a first seed number for a second seed number with the second scrambler;

generating from said exchanged first and second seed numbers a first code, at least part of which starts the sequential frequency inverting of the unsecure first message and a second code, at least part of which starts the sequential frequency reinverting of the secure second message; and transmitting a first code synchronization signal on the channel and receiving a second code synchronization signal from the channel whereby frequency reinverting of the secure first message at the second scrambler may be synchronized to said first code synchronization signal and said second code may be synchronized to said second code synchronization signal.

20. A method in accordance with the method of claim 19 wherein said step of exchanging further comprises the steps of generating said first seed number and transmitting said first seed number in a first message burst on the channel 21. A method in accordance with the method of claim 19 wherein said step of exchanging further comprises the step of receiving said second seed number from the channel.

22. A method in accordance with the method of claim 21 wherein said step of generating further comprises the step of arithmetically combining said first seed number, said second seed number, at least one additive number, and at least one predetermined multiplication factor to generate said first code.

23. A method in accordance with the method of claim 22 wherein said step of generating further comprises the step of reading predetermined digits of said first code and shifting said code at intervals of time whereby a rolling code is created to further sequence the sequential frequency inversion.

24. A method in accordance with the method of claim 21 wherein said step of generating further comprises the step of arithmetically combining said first seed number, said second seed number, at least one additive number, and at least one predetermined multiplication factor to generate said second code.

25. A method in accordance with the method of claim 24 wherein said step of generating further comprises the steps of reading predetermined digits of said second code and shifting said code at intervals of time whereby a rolling code is created to further sequence the sequential frequency reinversion.

26. A method in accordance with the method of claim 20 wherein said step of transmitting a first code synchronization signal further comprises the steps of confirming reception of said second seed number and transmitting said first seed number in a second message burst prior to transmission of said first code synchronization signal.

27. A method in accordance with the method of claim 19 further comprising the step of synchronizing said second code to an internal clock signal if said second code synchronization signal is not received from the channel.

28. A method in accordance with the method of claim 19 further comprising the step of coordinating said first code synchronization signal and said second code synchronization signal whereby said first code synchronization signal and said second code synchronization signal occur essentially simultaneously.

29. A method in accordance with the method of claim 19 further comprising the step of muting said secure first message during said transmission of said first code synchronization signal.

30. A method in accordance with the method of claim 19 further comprising the step of indicating said steps of transmitting a first code synchronization signal and receiving a second code synchronization signal have commenced.

31. A method in accordance with the method of claim 23 further comprising the steps of determining whether sequential rolling code numbers are equal and for ignoring a second code number equal to an adjacent first code number.

32. A method in accordance with the method of claim 19 further comprising the steps of receiving said first code synchronization signal at the second scrambler and transmitting a synchronization request signal if said first code synchronization signal is not received.

33. A method in accordance with the method of claim 32 further comprising the step of detecting said synchronization request signal at the scrambler and transmitting a third code synchronization signal on the channel in response to said synchronization request signal detection.

34. A method in accordance with the method of claim 33 further comprising the steps of receiving said third code synchronization signal at the second scrambler and transmitting a synchronization lost signal if said third code synchronization signal is not received, thereby terminating the frequency inverting of the unsecure first message.

35. A method in accordance with the method of claim 34 further comprising the step of transmitting from the second scrambler a third seed number whereby the frequency inverting of the unsecure first message may be started.

36. An analog audio frequency band scrambling system which provides security of communications over a duplex interruptible band-limited channel by sequentially frequency inverting an unsecure first message with a sequence of inversion frequency signals at an originating station before transmission as a secure first message on a first half of the duplex channel and by synchronously frequency reinverting the secure message with a like sequence of inversion frequency signals to recover the unsecure first message at an answering station and similarly inverting, transmitting, and reinverting an unsecure second message from the answering station to the originating station on a second half of the duplex channel, the system further comprising:

(a) initialization means comprising,
 means at the originating station for generating a first seed number;
 means at the originating station for transmitting said first seed number in a first message burst on the first half of the duplex channel;
 means at the answering station for generating a second seed number;
 means at the answering station for receiving said first seed number from said first half of the duplex channel and for transmitting said second seed number on the second half of the duplex channel in response to said receiving of said fist seed number;
 means at the originating station for receiving said second seed number and generating a first rolling code number and a second rolling code number wherein said first and second rolling code numbers each comprise an arithmetic combination of said first seed number, said second seed number, at least one predetermined additive number, and at least one predetermined multiplication factor;
 means at the answering station for generating said first and second rolling code numbers;

(b) synchronization means comprising,
 means at the originating station for confirming reception of said second seed number;
 means at the originating station for transmitting said first seed number in a second message burst and for subsequently transmitting a first synchronizing signal at periodic intervals on the first half of the duplex channel;
 means at the answering station for receiving said transmitted first seed number second burst on the first half of the duplex channel and for transmitting a first seed number reception confirmation message and subsequently transmitting a second synchronizing signal at periodic intervals on the second half of the duplex channel;
 means at the originating station for synchronizing said second rolling code number to said second synchronizing signal;
 means at the answering station for synchronizing said first rolling code number to said first synchronizing signal;

(c) encoding means comprising,
 means at the originating station for sequentially sampling said first rolling code number and for utilizing said originating station first rolling code number samples to generate the sequence of inversion frequency signals at the originating station;
 means at the answering station for sequentially sampling said first rolling code number and for utilizing said answering station first rolling code number samples to generate the sequence of reinverting frequency signals;
 means at the answering station for sequentially sampling said second rolling code number and for utilizing said answering station second rolling code number samples to generate the sequence of inversion frequency signals at the answering station; and means at the originating station for sequentially sampling said second rolling code number and for utilizing said originating station second rolling code number samples to generate the sequence of reinverting frequency samples.

37. An analog audio frequency band scrambling system in accordance with claim 36 further comprising means at the answering station for synchronizing said first rolling code number to an internal clock if said first synchronizing signal is not received a first time after said periodic interval.

38. An analog audio frequency band scrambling system in accordance with claim 37 further comprising means at the answering station for ceasing to transmit a secure second message over said second half of the duplex channel if said first synchronizing signal is not received a second time in said periodic interval.

39. An analog audio frequency band scrambling system in accordance with claim 36 further comprising means, responsive to said means for ceasing at the originating station, for generating a third seed number and transmitting said third seed number on the second half of the duplex channel whereby secure communications may again be resumed.

40. An analog audio frequency band scrambling system in accordance with claim 36 further comprising means at the originating station and a-t the answering station for coordinating said first and second synchronizing signals whereby said first and second synchronizing signals occur essentially simultaneously.

41. An analog audio frequency band scrambling system in accordance with claim 36 further comprising means at the originating station for muting said first secure message during transmission of said first synchronizing signal.

42. An analog audio frequency band scrambling system in accordance with claim 36 wherein said means at the originating station for generating a first seed number further comprises means for continuously generating a plurality of random numbers and for seizing one of said plurality of random numbers as said first seed number.

43. An analog audio frequency band scrambling system in accordance with claim 36 wherein said means at the answering station for generating a second seed number further comprises means for continuously generating a plurality of random numbers and or seizing one of said plurality of random numbers as said second seed number.

44. An analog audio frequency band scrambling system in accordance with claim 36 further comprising means at the originating station further comprising means for determining whether sequential rolling code numbers are equal and for ignoring a second code number equal to an adjacent first code number.

45. A cellular radiotelephone analog audio frequency band scrambler which provides security of communications over a duplex radiotelephone communications channel by sequentially frequency inverting an unsecure first message for transmission as a secure first message on the channel to a second analog audio frequency band scrambler and by sequentially frequency reinverting a secure second message received from the second scrambler on the channel, the scrambler comprising:

means for establishing a cellular radiotelephone call between said cellular radiotelephone analog scrambler and the second scrambler;

means for exchanging a first seed number for a second seed number with the second scrambler;

means for generating from said exchanged first and second seed numbers a first code to sequence the frequency inverting of the unsecure first message and a second code to sequence the frequency reinverting of the secure second message; and means for transmitting a first code synchronization signal on the channel and for receiving a second code synchronization signal from the channel whereby frequency reinverting of the secure first message at the second scrambler may be synchronized to said first code synchronization signal and said second code may be synchronized to said second code synchronization signal.

46. A cellular radiotelephone analog audio frequency land scrambler in accordance with claim 45 further comprising means at the second scrambler for transmitting a synchronization request signal if said first code synchronization signal is not received due to handoff.

47. A cellular radiotelephone analog audio frequency band scrambler in accordance with claim 45 further comprising means at the second scrambler for transmitting a second seed number when said cellular radiotelephone call is established.

* * * * *